(12) United States Patent
Hendriks et al.

(10) Patent No.: US 10,442,955 B2
(45) Date of Patent: *Oct. 15, 2019

(54) RESIN, COMPOSITION AND USE

(71) Applicant: DSM IP ASSETS B.V., Heerlen (NL)

(72) Inventors: Johannes Wilhelmus Maria Hendriks, Echt (NL); Adrianus Jozephus Hendricus Lansbergen, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,677

(22) Filed: Jan. 17, 2018

(65) Prior Publication Data

US 2018/0142121 A1 May 24, 2018

Related U.S. Application Data

(63) Continuation of application No. 14/398,051, filed as application No. PCT/EP2013/059607 on May 8, 2013, now Pat. No. 9,902,870.

(30) Foreign Application Priority Data

May 8, 2012 (EP) .................... 12167160

(51) Int. Cl.
| | |
|---|---|
| *C08L 67/06* | (2006.01) |
| *C08L 67/08* | (2006.01) |
| *C09D 167/06* | (2006.01) |
| *C09D 167/08* | (2006.01) |
| *C08G 63/49* | (2006.01) |
| *C08G 63/48* | (2006.01) |
| *C08G 63/47* | (2006.01) |
| *C08G 63/52* | (2006.01) |
| *C08G 63/54* | (2006.01) |

(52) U.S. Cl.
CPC .......... *C09D 167/08* (2013.01); *C08G 63/47* (2013.01); *C08G 63/48* (2013.01); *C08G 63/52* (2013.01); *C08G 63/54* (2013.01); *C09D 167/06* (2013.01); *Y10T 428/31786* (2015.04)

(58) Field of Classification Search
USPC ................................. 523/500, 501
See application file for complete search history.

(56) References Cited

U.S. PATENT DOCUMENTS

| | | | | |
|---|---|---|---|---|
| 3,306,866 | A * | 2/1967 | Percival .............. | C08G 63/48 523/336 |
| 4,133,785 | A * | 1/1979 | Henshaw ............ | C08G 63/48 428/458 |
| 4,983,716 | A | 1/1991 | Rao | |
| 9,902,870 | B2 * | 2/2018 | Hendriks ............ | C09D 167/08 |
| 2012/0202082 | A1 | 8/2012 | Fujii | |

FOREIGN PATENT DOCUMENTS

| | | |
|---|---|---|
| GB | 1049462 | * 11/1966 |
| GB | 1 358 725 | 7/1974 |
| WO | 2008/101722 | 8/2008 |
| WO | 2012/005645 | 1/2012 |

OTHER PUBLICATIONS

Magee et al., Composition of American Distilled Tall Oils, JAOCS, vol. 69, No. 4, pp. 321-324 (Apr. 1992).*
International Search Report for PCT/EP2013/059607, dated Oct. 21, 2013, 4 pages.
Written Opinion of the International Searching Authority for PCT/EP2013/059607, dated Oct. 21, 2013, 5 pages.

* cited by examiner

*Primary Examiner* — Tae H Yoon
(74) *Attorney, Agent, or Firm* — Nixon & Vanderhye P.C.

(57) ABSTRACT

Low VOC, unsaturated alkyd resins are obtained by reacting (A) to (E): (A) optionally from 0 to 30% w/w naturally occurring Rosin, comprising from 40 to 80 w/w parts per hundred of Rosin of an unsaturated mono carboxylic acid with at least one $C_{15-25}$cyclohydrocarbo moiety capable of a Diels Alder or Ene reaction (preferred monoacids being abietic acid, palustric acid, levopimaric acid, sandaracopimaric acid, and/or anhydrides thereof); (B) from 25 to 80% w/w of a linear $C_{12-60}$hydrocarbo carboxylic acid with at least one (preferably at least two conjugated) C=C bonds (=unsaturated fatty acid); (C) optionally from 1 to 30% w/w of an ethylenically unsaturated $C_{5-6}$hydrocarbo dicarboxylic acid and/or anhydride thereof, being reactive as a dienophile and/or enophile with A and/or B (preferred for C are itaconic acid, citraconic acid and/or anhydrides thereof); (D) from 1 to 40% w/w of at least one polyol; (E) optionally at least one monomer other than A to D—the total of A to E being 100%. There is a further optional step (II) where more or new (C) may be blended with the alkyd resin; the amount of C in blend being from 1 to 30 parts w/w of 100 parts of monomers (A) to (E)—and where (C) is at least used as a monomer and/or as a diluent in the blend and where alkyd resin (i) has acid value of <50 KOH/g of alkyd; (ii) Mn of >=1200 g/mol (iii) oil length <80; (iv) optionally biorenewable content >=50%.

21 Claims, No Drawings

RESIN, COMPOSITION AND USE

This application is a continuation of commonly owned U.S. Ser. No. 14/398,051 filed Oct. 30, 2014 (now U.S. Pat. No. 9,902,870), which is the national phase application of International Application No. PCT/EP2013/059607 filed May 8, 2013, which designated the U.S. and claims priority to EP Patent Application No. 12167160.6 filed May 8, 2012, the entire contents of each of which are hereby incorporated by reference.

The present invention relates to the field of resins for coating compositions in decorative applications such as paints, especially autoxidisable polyester resins such as alkyds as well as methods for making and using such resins and compositions containing them.

Alkyd paints for professional and do-it-yourself applications are subject to increasing technical and ecological restrictions. Emissions of volatile organic compounds (VOC) must be reduced to protect the environment and the use of high-solid alkyd resins is means to address this problem. The challenge when formulating high-solids coatings is to lower the resin viscosity without seriously adversely effecting coating properties for example by not increasing drying time and/or increasing yellowing. It is also a preferred object of the invention that the resins have a high biorenewable content as defined herein.

As used herein unsaturated alkyd resin (for convenience also abbreviated herein to "alkyd resin") denotes a polyester comprising one or more unsaturated fatty acid moieties which is autooxidisable under air at standard conditions.

Prior art alkyd resins are typically are obtained from a polycondensation of fatty acids or vegetable oils (30 to 70% by weight), polyols such as glycerol (10 to 40% by weight) and polyacids such as phtalic anhydride (10 to 40% by weight). These known alkyd resins have a broad molecular weight distribution; branched structure, contain residual hydroxyl and carboxyl groups for wetting properties and are capable of autoxidative drying. Due to self auto-oxidisation, alkyd resins discolour in the dark and turn yellow. This tendency is even more pronounced for renewable alkyds that contain rosin and a high proportion of fatty acid.

High solid renewable resins that have a low VOC are described in the applicant's patent application WO 2008-101722. These resins are prepared by grafting diacids and/or anhydrides onto an autoxidisable polyester resin using a Diels-Alder or Ene reaction to form alkyd adducts having an oil length ≥80, a number average molecular weight Mn≥1000 g/mol and a polyidispersity (PDI)≥3. However these resins are still unsatisfactory in some respects as for example the form coatings that have a tendency to yellow over time.

Surprisingly the applicant has found that low VOC coatings with a low degree of yellowing can be obtained using i) alkyd resins (preferably with short oil length) prepared from certain ethylenically unsaturated C5 or C6 diacid monomers (such as itaconic acid) and/or ii) blended compositions where C5 or C6 unsaturated diacids are used as a diluent mixed with an alkyd (which may or may not also be made from unsaturated C5-6 diacid monomers). Known alkyd resins prepared without these acids, for example solely from a combination of conventional monomers (such as sebacic acid, pentaerythritol and fatty acids) yellow to a much greater extent. Optionally the alkyd resins and alkyd resin blended compositions of the invention also exhibit improved tackiness performance and/or are obtainable using a high proportion of ingredients available from renewable sources.

It is an object of the present invention to solve some or all of the problems described herein.

U.S. Pat. No. 3,366,563 describes unsaturated anhydride adducts prepared from a Diels-Alder reaction of tung oil or linseed oil, rosin, maleic anhydride and a minor amount (<2%) of polyhydric alcohol (TME) (e.g. Example 6). Such adducts are used to prepare waterborne electrophoretic coatings. The use of itaconate components to prepare these adducts is not described.

GB1119662 (equivalent to U.S. Pat. No. 3,412,053) describes printing inks based on adducts of maleated oils that use no more than 20% of fatty acids such as tung oil (e.g. Example 5 made from linseed oil (a), modified ester of rosin (b), maleic anhydride c), dimethylethanolamine). Example 1 of U.S. '053 describes a blend of tung-maleic and rosin-maleic adducts which is highly neutralised to form a low molecular weight material. Ethylene glycol is added as a cosolvent but does not react as polyol as it is added below the esterification temperature. These adducts do not introduce branching or increase molecular weight into the material but are used to attach neutralisable acid groups. The resultant adducts have high acid values, low molecular weight and are very readily hydrolysed.

As mentioned previously WO 2008-101722 (DSM) describes low VOC renewable alkyd resins which are prepared by a solvent borne reaction between tung oil and certain diacids (or their anhydrides) via a Diels-Alder reaction to form an adduct which is then further reacted with an alcohol such as glycerol to form an alkyd of medium to high molecular weight and very long oil length (>=80). Four diacids are stated to be highly preferred in making these alkyds: maleic acid (4 carbon atoms), maleic anhydride (C4), itaconic acid (C5) and/or fumaric acid (C4), although all the examples are only prepared from maleic anhydride. There is no suggestion that the itaconic acid (with 5 carbon atoms) might produce alkyds having advantageous properties compared to alkyds produced from C4 diacids. The patent also explains in detail (on page 7, lines 2 to 11) why it is important to prepare alkyds with a special combination of 'high oil length and relatively high molecular weight" as this has the "strongest influence on the properties of the obtained [alkyd]". Further advantages of a high oil length are given on page 7, lines 34 to page 8, line 5). Thus a reader of this document is strongly deterred from preparing alkyds with an oil length lower than the 80 minimum value given in this document. The adducts described and prepared in this patent application are not stated to have any advantageous impact on yellowing properties. Indeed this document teaches (on page 15, lines 14 to 16) that it is important to control (lower) amine number average functionality below about 0.2 "to reduce yellowing considerably", which strongly implies that the alkyds described would otherwise yellow to a high degree. Thus a skilled reader would have every reason to believe that that alkyds prepared from any of the preferred diacids listed above (including itaconic acid) would exhibit significant yellowing. A person who wished to solve the problem of providing alkyds having reducing yellowing would not consult this document or would be deterred from using itaconic acid to prepare such alkyds. Thus a reader is taught away from preparing alkyds of the present invention that are made from C5 to C6 di-acids and have an short oil length lower than 80 and would have no reason to expect such alkyds to yellow to a much reduced extent than other alkyds. There is also no reason a reader of this document would blend the alkyds described with additional C5 or C6 diacid (such as itaconic acid) as a diluent. There would be no expectation that such blends would also exhibit reduced yellowing.

CN101880379 describes maleic anhydride adducts of rosin containing alkyd, emulsified by neutralising adducted alkyd resin and cured autoxidatively. The maleic anhydride adducts are not further esterified, and itaconates are not mentioned at all.

JP56088425 describes drying oils and/or fatty acids that are reacted with polyol and rosin maleic anhydride adducts. The resulting alkyds are emulsified in an apolar solvent (like benzene) and solvent is removed afterwards. Theoretically no fatty acid maleic adducts are used or made. Itaconates are not mentioned.

GB1026878 describes mono-alcohol reaction products of adducts from fatty acids or oils with olefinic carboxylic acids. Minor amounts of rosin may be added. An example describes the esterification of the reaction product of maleic anhydride and linseed oil with cyclohexanol followed by the addition of water and triethylamine. The acid value was reduced to 60-65 mg KOH/g and although anhydride adducts were reacted to a large extent, the molecular weight did not increase. The resultant product gave water-resistant, tough, glossy films on air-drying in the presence of cobalt naphthenate.

The use of crude tall oil as feed-stock for alkyd resins is described by Suarez, P. A. Z et al. (2008 E-Polymers, art. no. 58 1). Alkyd resins based on tall oil containing 40% of rosin are reacted with maleic anhydride and then polyesterified. The preparations described use only a negligible amount of maleic anhydride (0.7%).

"Self-emulsifying binders for waterborne coatings—Synthesis and characteristics of maleated alkyd resins" (Journal of Applied Polymer Science, 5 Jan. 2011, vol. 119 (1), pp 209-218, Heiskanen, N. et al.) describes waterborne alkyds based on maleated adducts of Tall Oil Fatty Acids (also referred to herein as TOFA), which are reacted at low temperature with conventional alkyds. The adduct is not used for molecular weight increase and high acid values are created of >80 mgKOH/g. Rosin is not mentioned as a resin component.

GB1358725 (Dainippon Toryo) describes a dispersion of synthetic polymer particles of size from 0.1 to 10 microns in an organic liquid. The polymer is a block or graft copolymer of (a) an alkyd resin of Mn from 500 to 10000 modified with unsaturated fatty acid, (b) acrylonitrile and (c) at least one other comonomer. The weight ratio of (a) to (b)+(c) is from 80/20 to 70/30. The organic liquid dissolves the acrylonitrile (b) but does not dissolve the copolymer formed from (a), (b) and (c). This document describes non-aqueous dispersions of acrylonitrile modified alkyds. Use of an organic liquid dispersant results in an alkyd resin containing a significant amount of volatile organic compounds. This is confirmed by the examples as Example 1 describes in a first stage an alkyd resin varnish prepared by condensation of soybean oil, phthalic anhydride, glycerine and ethylene glycol in a mineral spirit solution containing 70% of non-volatile components (one can thus infer that 30% of the spirit components are volatile). The varnish is modified with 400 parts methyl methacylate, 100 parts stryene and 7 parts benzoyl peroxide in a second stage to form an alkyd resin later copolymerised with acrylonitrile. Similar modifications are made to the first stage alkyd of Example 1 to prepare the remaining Examples 2 to 4. All the exemplified alkyds contain significantly high amounts of VOC. The acrylonitrile is reactive as a monomer for a polyaddition reaction, and does not react as dienophile. The use of acrylonitrile may also be undesirable for environment and other reasons. Dianippon teaches away from preparing low VOC alkyds or use of a cycloaddition reaction to prepare them.

The prior art alkyds described above are mostly adducts of maleate and rosin, that are mainly prepared for baking applications (e.g. electrocoat). These alkyds have a high acid value (at least 60 mg KOH/g) as the adducted maleic anhydride is mostly not esterified, but is used for neutralisation and emulsification. The prior art does not suggest that air-drying alkyds with reduced yellowing, low acid value and short oil length might be prepared by esterifying adducts of unsaturated C5 to C6 diacids in fatty acid and/or rosin.

Therefore broadly in accordance with the present invention there is provided a low VOC composition comprising an unsaturated alkyd resin obtained and/or obtainable by reaction in a process (I) between the following components:

(A) Optional Component A comprising from 0 to 30%, preferably 1 to 30% by weight of naturally occurring Rosin, the Rosin comprising from 40 to 80 parts per hundred by weight of Rosin of an unsaturated mono carboxylic acid comprising at least one $C_{15-25}$cyclohydrocarbo moiety (optionally comprising at least two preferably three fused rings) capable of undergoing a Diels Alder or Ene reaction (such as abietic acid, palustric acid, levopimaric acid and/or sandaracopimaric acid, derivatives and/or isomers thereof);

(B) Component B comprising from 25 to 80% by weight of a linear $C_{12-60}$hydrocarbo carboxylic acid comprising at least one, preferably at least two, more preferably at least two conjugated ethylenically unsaturated double bonds;

(C) Optional Component C comprising from 1 to 30% by weight of an ethylenically unsaturated $C_{5-6}$hydrocarbo dicarboxylic acid (preferably C5 diacid), ester thereof and/or anhydride thereof, being reactive as a dienophile and/or enophile with Component B and/or Component A where present;

(D) Component D comprising from 1 to 40%, preferably 1 to 30%, by weight of at least one polyhydric alcohol;

(E) Optional Component E comprising at least one monomer other than any of Components A to D the total of Components A to E being 100%.

to obtain an alkyd resin and then (II) in an optional blending step, adding Component C to the alkyd resin obtained from step (I) to form a admixture therewith; Component C being present in an amount of from 1 to 30 parts by weight with respect to 100 parts of monomers (A) to (E) above where Component C is at least used as a monomer in process (I) and/or as a diluent in the blending step (II).

where the alkyd resin obtained from process (I)

(i) has an acid value of no more than 50 preferably less than 30 mg KOH per g of the solid alkyd resin (obtained as described above);

(ii) has a number average molecular weight (Mn) of at least 1200 g/mol preferably 1500 g/mol; and (iii) optionally has an oil length less than 80;

(iv) optionally has a renewable content (as defined herein) of at least 50%, preferably at least 80%, more preferably at least 90%, for example 100% by weight of components (A) to (E) where present.

where low VOC denotes that the total amount of organic compounds that have a boiling point from 50 to 250° C. (volatile organic compounds or VOC) that may be present in the composition is less than 100 g/l.

It can be seen that although Component C is an essential element of the compositions of the present invention it can be introduced either as a monomer to prepare the alkyd resins and/or by blending Component C with the alkyd resin in which case use of Component C as a monomer to prepare the alkyd resin is optional.

Broadly a further aspect of the invention provides an alkyd resin prepared as described herein, where the monomer Component C is not optional and preferably the alkyd resin has an oil length less than 80.

The total amount of VOC (as defined above) that may comprise any of components (A) to (E)) is ideally kept as low as possible as this makes it much easier to ensure that the unsaturated alkyd resins of the invention obtained from these components will also have a low VOC content. Preferably the total amount of VOC present in components (A) to (E) is no more than 10%, more preferably no more than 5%, most preferably no more than 2%, for example no more than 1% by total weight of the components (A) to (E). Usefully the components (A) to (E) have less than 100 g/l of VOC, more usefully are substantially free of, most usefully completely free of, any VOC.

Preferred unsaturated alkyd resins of the invention comprise less than 20%, more preferably less than 10% by weight of acrylonitrile (and/or repeat units based on an acrylonitrile monomer) on the total weight of components (A) to (E), most preferably are substantially free of acrylonitrile.

It can be seen from the description herein that alkyd resins of the invention are different from resins having an acid value of 15 and an average molecular weight of 2300 obtained by the condensation reaction of soybean oil, phthalic anhydride, glycerine and ethylene glycol (such as described in Example 1 of GB1358725), and are also different from resins having an acid value of <16 mg KOH/g and Mn of 1802 g/mol obtained by heating tung oil, tall oil fatty acid, maleic anhydride and glycerol (such as described in Examples 1 and 2 of WO2008-101722). and such prior art resins do not form part of the present invention.

It will be self evident that the weight percentages of Components (A) to (E) where present total 100% and the amounts of each given herein are calculated as a proportion of the total amount of these monomer components (A) to (E) being 100%. Thus presence of any other ingredients in the alkyd resin or composition (e.g. surfactant) does not effect these percentage values. For example where Component C is added in blending step (II) as a diluent to form an admixture with the alkyd resin, the amounts in which Component C may be added can correspond to absolute weight values equivalent to the various percentage ranges given herein for Component C when added as a monomer in process (II). It will be appreciated that the amounts of Component C present as a diluent will not then be percentages but will be expressed as corresponding weight parts of Component C with respect to 100 weight parts of the total monomers (Component (A) to (E) monomers totalling 100%—including where present any Component (C) used as monomer in process (I)). Where Component C is used both as a monomer and as a diluent, the Component C may be the same or different, preferably the same.

VOC denotes volatile organic compounds (VOC) that have a high vapour pressure under standard conditions preferably being those compounds with a boiling point from 50 to 250° C. The term "low VOC" as used herein denotes that the amount of VOC present in a liquid composition, resin and/or component thereof is less than 100 g/l, preferably <50 g/l (same values per kg if a solid material).

Alkyd resins of the invention may for example be prepared in solvent, in aqueous media, (e.g. as a water borne (WB) emulsion) or as a solid (e.g. to form a powder composition). Preferred resins are solvent or water borne, more preferably WB. WB resins of the invention can be emulsified by conventional means. Alkyd resins of the invention can be cured by standard catalysts.

If the alkyd resin is water borne it may be prepared the presence of an aqueous medium, preferably comprising at least one surfactant.

Where the resin of the invention is emulsified in water, the process and surfactants that may be used are well known to those skilled in the art. Preferably a mixture of surfactants is used, more preferably a combination of anionic and non-ionic surfactant systems. The surfactant can be added as a separate ingredient not part of Components A to E, and/or one or more of Components A to E may have suitable functional groups thereon to aid dispersion in water, in which case no (or alternatively reduced amount of) separate surfactant may be needed to obtain a stable emulsion.

Examples of surfactant systems that may be used to emulsify alkyd resins are described in US2003-144397 (ICI) and in "Emulsification and Polymerization of Alkyd Resins" by Jan W. Gooch, Springer, first edition 1 Dec. 2001 (ISBN 0306467178) and the contents of both of these are incorporated herein by reference.

Alkyd resins of the invention have an oil length of less than 80. As used herein "oil length" is defined as the number of grams of oil used to produce 100 g of the alkyd resin. In this context "oil" means all hydrophobic liquid (i.e. material substantially immiscible with water under standard conditions that is also liquid under standard conditions) that comprises any of Components (A) to (E) herein in whole or in part and thus oils may comprise mixtures or a single component. For example oils (such as calendula oil, cottonseed oil, dehydrated castor oil, fatty acid oil, fish oil, linseed oil, safflower oil, soy oil, sunflower oil, tall oil, tung oil and/or mixtures thereof) may comprise the whole or a main part of the Components (A) and/or (B) described herein. In blended compositions of the invention alkyds with an oil length greater than or equal to 80 may be used, though compositions with these high oil length alkyds are not preferred. In a more preferred embodiment of the compositions and/or alkyds of the invention, the oil length of the alkyd resins is less than or equal to 78, most preferably is from 60 to 78, for example is from 65 to 78.

Optionally the short oil length alkyds of the invention may have a viscosity of 500 Pa·s or more when measured at 100% solids content at 23° C. It will be appreciated that emulsions of the alkyds of the invention (e.g. as described in the examples herein) will usually have a viscosity which is much lower than that of the solid resin.

Preferred alkyd resins of the invention comprise at least 55%, more preferably at least 65%, most preferably at least 80%, for example at least 95% (e.g. about 100%) by weight of components obtained from a bio-renewable (i.e. non-fossil, bio-based) source.

Broadly one alternative aspect of the invention provides alkyd resins that are obtained and/or obtainable from a cycloaddition polymerisation of the following components:
(A) from 1 to 30% by weight of a rosin obtained from tall oil and comprising at least 50% by weight of rosin (preferably from 50 to 75% by weight of rosin) of abietic acid, derivatives and/or isomers));
(B) (i) from 1 to 40%, preferably 1 to 30% by weight of an oil selected from tung oil, calendula oil, linseed oil and/or, oils that comprise glycerol esters of fatty acids and (ii) optionally from 25 to 80% by weight of an additional fatty acid and/or oil not in group (B)(i) provided that the total amount of component B is at least 25% by weight. Preferably Component B is selected from TOFA, soya bean fatty acid, linseed oil fatty acid, and/or conjugated fatty acids such as dehydrated castor oil fatty acid, more preferred is TOFA;

(C) from 1 to 30% by weight of pentendioic acid or anhydrides thereof, preferably selected from citraconic acid, itaconic acid, mesaconic acid, glutaconic acid, esters thereof and/or anhydrides thereof, more preferably citraconic acid, itaconic acid and/or anhydrides thereof; and (D) from 1 to 40% by weight of at least one polyol selected from glycerol, isosorbide, mannitol, pentaerythritol, sorbitol and/or mixtures thereof, more preferably glycerol and/or pentaerythritol. Usefully from a bio-renewable source.

In any of the processes of the invention as described herein it is preferred that the oil used to produce the alkyds of the invention is present in a total amount of less than 80 g of oil per 100 g of the alkyd produced, more preferably less than 78 g oil per 100 g alkyd, most preferably is from 60 to 78 g oil per 100 g alkyd, for example is from 65 to 78 g oil per 100 g of alkyd.

It will be appreciated that some or all of the Components (A) to (E) may be added as separate ingredients and/or in one or more mixtures of two or more of Components (A) to (E). For example many common Rosins are derived from Tall Oil Fatty Acids (TOFA) and so are often sold with some TOFA or other fatty acids or oils present as an impurity. Such Rosins will thus comprise both some Component A (e.g. Rosin abietic acid) and some Component B (e.g. TOFA). For example currently commercial Rosin products exist with a TOFA content up to 27% by weight of the product. Many commercially available fatty acids are also mixtures and for example may include other ingredients such as saturated fatty acids (not part of Component B) as well as the unsaturated fatty acids that comprise Component B.

Thus the ingredients actually used in practice to make the alkyd resin in Process (I) may not have a one to one correspondence to each of the separate Components (A) to (E). Similarly the weight of such ingredients may not precisely correspond to the percentages given for the Components (A) to (E). However even if added as parts of various mixtures this will not effect how the percentages or amounts of Components (A) to (E) are calculated and if necessary the fraction of any ingredient that comprises each of the Components (A) to (E) can be readily determined by suitable analytical techniques well known to those skilled in the art.

In one convenient embodiment the alkyd resin of the invention is an adduct of tung oil, rosin, citraconic acid, a biobased polyol and any remaining fatty acid.

In another useful embodiment the alkyd resin of the invention is an esterification product of Rosin, at least one fatty acid and/or oil, at least one polyol and at least one of itaconic acid, citraconic acid, itaconic anhydride, citraconic anhydride and/or mixtures thereof.

Alkyd resins of the invention can be prepared in two alternative routes, so called 'normal" and 'reverse' processes which are described herein and in the claims. Components A to E may be as described herein.

A further aspect of the invention provides a first process for making an alkyd composition of the invention as described herein, comprising the steps of:

(1) cyclo-reacting in a first (cycloaddition) step a Component (C) (e.g. itaconic acid) with at least one of optional Component (A) (e.g. Rosin) and/or optional Component (B) (e.g. Fatty acid) in a cycloaddition reaction to form an optionally acid functional alkyd adduct optionally the first step occurring in the presence of Components D and/or E which may or may also undergo cyclo-addition;

(2) esterifying in an optional second (esterification) step the adduct from the first step with:
  (i) a Component (D1) a polyol (which may be the same or different as Component (D) if present in the first step) and
  (ii) optionally a Component (B1) a fatty acid (which may be the same or different as Component (B) if present in the first step).

A further aspect of the invention provides a second process for making an alkyd composition of the invention as described herein, comprising the steps of:

(1) esterifying in a first step Component (D) (polyol) with at least one of optional Component (A) (e.g. Rosin) and/or optional Component (B) (e.g. Fatty acid) in an esterification reaction to form an optionally hydroxy functional alkyd adduct;

(2) cyclo-reacting in a second (cycloaddition) step the esterified adduct from the first step with:
  (i) a Component (C) (e.g. itaconic acid); and
  (ii) optionally a Component (B1) a fatty acid (which may be the same or different as Component (B) if present in the first step);

(3) optionally in a third step further esterifying the adduct from the second step with further hydroxy functional alkyd adduct prepared as described in and/or from the first step; and (4) optionally in a further step blending the alkyd resin obtained from the second (and/or third step if present) with Component (C) as a diluent.

The second process of the invention may also be referred to herein as the reverse process (as the sequence of steps has been reversed from those of the first process which may also be informally referred to herein as the "normal" process).

Optionally the first step of the reverse process may occur in the presence of Component C and/or E which may or may not also undergo esterification.

Thus broadly in accordance with the present invention there is provided a process for making an alkyd resin of the invention or alkyd resin composition of the invention the process comprising a cyclo-addition step and an esterification step these steps being performed in any order where:

(1) the cycloaddition step comprises cyclo-reacting Component (C) being reactive as a dienophile and/or enophile and comprising an ethylenically unsaturated $C_{5-6}$ hydrocarbo dicarboxylic acid, ester thereof, and/or anhydride thereof, with at least one dienophile and/or enophile reactive component selected from:

Component (A) comprising a naturally occurring Rosin comprising from 40 to 80 parts per hundred by weight of Rosin of an unsaturated mono carboxylic acid comprising at least one $C_{15-25}$ cyclohydrocarbo moiety capable of undergoing a Diels Alder or Ene reaction; and/or Component (B) comprising a linear $C_{12-60}$ hydrocarbo carboxylic acid comprising at least one conjugated ethylenically unsaturated double bond; and/or an alkyd adduct formed by reacting Component (D) comprising a polyol with at least one of a Component (A) and/or a Component (B); and (2) the esterification step comprising reacting
   at least one acid functional component selected from;
      an acid functional alkyd adduct formed by reacting a Component (D) with at least one of a Component (A) and/or a Component (B);
      a Component (A); and/or
      a Component (B); with
   at least one hydroxy functional component selected from;
      a hydroxyl functional alkyd adduct formed by reacting a Component (D) with at least one of a Component (A) and/or a Component (B); and
      a Component D; where
         at least one Component (B) is present in the esterification and/or cycloaddition steps; and
         at least one Component (D) is present in the esterification and/or cycloaddition steps; and where
         the product from the cyclo-addition step is used as a component in a later esterification step (Normal process); or
         the product from the esterification step is used as a component in a later cyclo-addition step (Reverse Process)

The Normal Process of the invention may thus comprise the steps of:
(1) cyclo-reacting in a first (cycloaddition) step
   (i) Component (C) being reactive as a dienophile and/or enophile and comprising an ethylenically unsaturated $C_{5-6}$hydrocarbo dicarboxylic acid, ester thereof, and/or anhydride thereof, with at least one of
   (ii) Component (A) comprising a naturally occurring Rosin comprising from 40 to 80 parts per hundred by weight of Rosin of an unsaturated mono carboxylic acid comprising at least one $C_{15-25}$cyclohydrocarbo moiety capable of undergoing a Diels Alder or Ene reaction; and/or
   (iii) Component (B) comprising a linear $C_{12-60}$hydrocarbo carboxylic acid comprising at least one conjugated ethylenically unsaturated double bond; (i.e. where at least one of (ii) Component (A) and/or (iii) Component (B) are present);
      to form, via a cycloaddition reaction, alkyd adduct which is optionally acid functional; followed by
(2) esterifying in second (esterification) step the alkyd adduct from the first step with at least one of:
   (i) Component (D) comprising a polyol; and/or
   (ii) further alkyd adduct prepared analogously to as described in the first step optionally in such a manner that the further alkyd adduct is hydroxy functional; and/or
   (iiii) optional Component (B1) being a linear $C_{12-60}$hydrocarbo carboxylic acid comprising at least one conjugated ethylenically unsaturated double bond; which may be the same or different as Component (B) if present in the first step;
      (i.e. where at least one of (i) Component (D) and/or (ii) the further alkyd adduct are present);
      to form an alkyd resin;

A Reverse Process of the present invention may thus comprise the steps of:
(1) esterifying in a first step Component (D) comprising a polyol with at least one of
   (i) Component (A) comprising a naturally occurring Rosin comprising from 40 to 80 parts per hundred by weight of Rosin of an unsaturated mono carboxylic acid comprising at least one $C_{15-25}$cyclohydrocarbo moiety capable of undergoing a Diels Alder or Ene reaction; and/or
   (ii) Component (B) comprising a linear $C_{12-60}$hydrocarbo carboxylic acid comprising at least one conjugated ethylenically unsaturated double bond; (i.e. where at least one of (ii) Component (A) and/or (iii) Component (B) are present)
      to form, via an esterification reaction, an alkyd adduct which is optionally hydroxy functional; followed by
(2) cyclo-reacting in a second (cycloaddition) step the esterified adduct from the first step with:
   (i) Component (C) reactive as a dienophile and/or enophile and comprising an ethylenically unsaturated $C_{5-6}$hydrocarbo dicarboxylic acid, ester thereof, and/or anhydride thereof; and
   (ii) optionally a Component (B1) comprising a linear $C_{12-60}$hydrocarbo carboxylic acid comprising at least one conjugated ethylenically unsaturated double bond; which may be the same or different as Component (B) if present in the first step
      to form an alkyd resin.

It will be appreciated that to obtain an alkyd resin of the invention at least one Component (B) and/or (B1) are present in in at least one of the steps of the Normal and of the Reverse Processes of the invention.

Optionally the cycloaddition step occurs in the presence of:

Component D1 comprising a polyol which may be the same or different as Component (D) if used in the esterification step and/or Component E being another monomer not being any of Components A to D.

Optionally Components D1 and/or E may or may not optionally undergo cyclo-addition if present during this step.

The processes described above (including the Normal and Reverse Processes) may comprising a further step of blending the alkyd resin obtained from the process with a diluent of Component (C1) comprising ethylenically unsaturated $C_{5-6}$hydrocarbo dicarboxylic acid, ester thereof, and/or anhydride thereof which may be the same or different as Component (C) in the previous steps.

Preferably either process of the invention is used to prepare an aqueous alkyd composition in which case the processes may comprise a further (emulsification) step optionally comprising adding suitable surfactant to the reaction mixture. The emulsification may occur simultaneously with any of the steps described above for the first and second processes, or sequentially with either after their first steps or alternatively after their second steps.

Thus in various preferred embodiments of the invention Component C (e.g. itaconic acid) can be grafted onto to the Rosin (A) but also onto the oil and/or fatty acid (B), depending on the presence of conjugated double bonds in these components.

Optionally a further monomer E may be used as a reactant in any of the previous steps of either process.

The steps of either process may be sequential or simultaneous and/or may be in the same reactant vessel.

Preferably in the first process of the invention the cycloaddition in the first step is selected from a Diels-Alder or Ene reaction, more preferably a Diels-Alder reaction. Where the first step includes a Component (B) that comprises linseed oil the first step may comprise an Ene reaction at least in part.

Optionally the adduct of the invention formed in the first step of the first or second process from Components (A) and (C) and optionally (B) and (D) is an acid which may be esterified in a further step with a Component (D1) which comprises a polyol as described in Component (D) which may be present in the same or different amounts as given for the first step. Preferably Component (D1) is a polyhydric alcohol with two or more hydroxyl groups, more preferably selected from glycerol, isosorbide, pentaerythritol and/or sorbitol. Optionally Component (B1) (fatty acid) may be added during this second step in addition to and/or instead of the Component (B) added in the first step, also in the same or different amounts as given for Component (B) the first step.

Without wishing to be bound by any mechanism the applicant believes that a possible non-limiting synthetic route for an embodiment of the first step of the first process of the invention can be shown schematically below. In this embodiment citraconic anhydride (derived from itaconic acid) is used to prepare a Diels Alder adduct with the abietic acid in the Rosin. Three stages of the possible mechanism are shown below. Firstly abietic acid is believed to isomerise to levopimaric acid, then itaconic acid is believed to be converted to citraconic anhydride (via itaconic anhydride which isomerises) and finally it is believed that the levopimaric acid and the citraconic anhydride undergo a Diels Alder reaction to form the adduct shown.

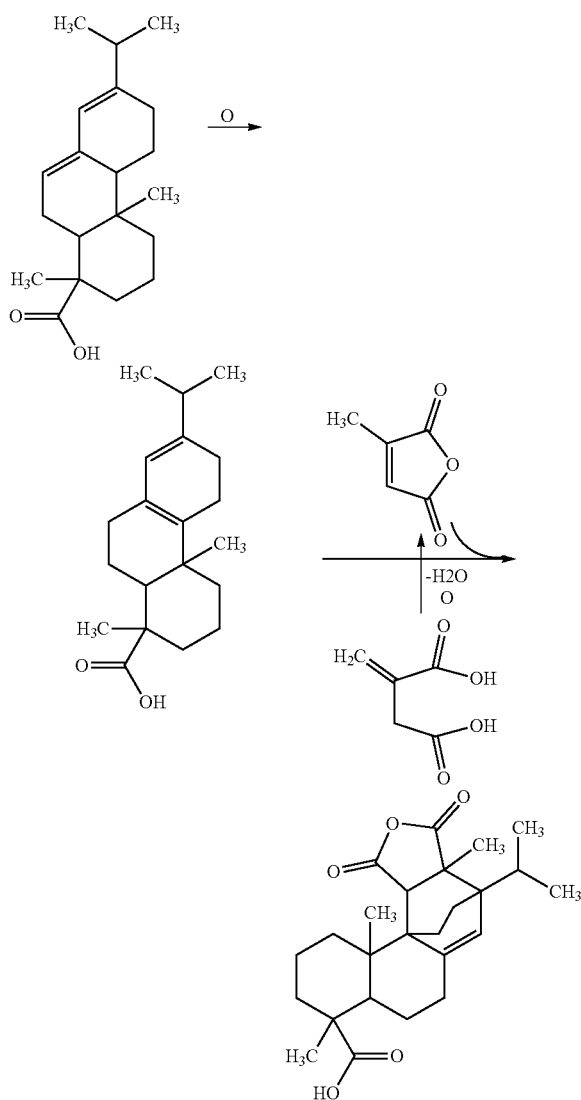

Another possible mechanism for an embodiment of the process of the invention is shown schematically below where it is believed that itaconic acid undergoes a Diels Alder addition to a fatty acid from tung oil (via citraconic anhydride). In the formulae below R denotes any suitable substituent such as residue fatty acid moieties.

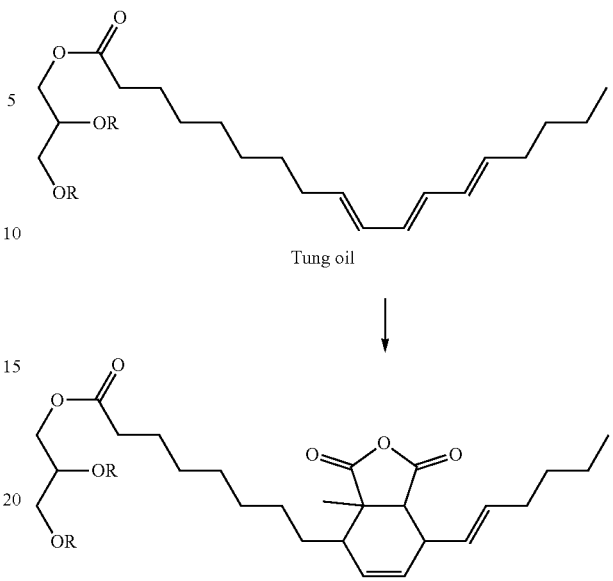

Advantages of using a Diels Alder reaction to graft monomers onto an autoxidisable polyester resin are described in WO 2008-101722 from page 4 line 7 to page 7 line 13 (and this passage is hereby incorporated herein by reference).

Component (A) (e.g. Rosin)

The term "rosin" refers to a chemical mixture isolated from various natural sources, typically "tall oil" which is a by-product of pulping softwoods. Tall oil can also be obtained from the distillation of Crude Tall Oil (CTO). Other sources include gum rosin (commonly found in Portugal and China). Whilst the composition of rosins will vary somewhat according to their source, usually they comprise as a major component unsaturated mono carboxylic acids comprising at least one ring structure (such as those having at least one, preferably two $C_{3-8}$cyclohydrocarbo moieties), for example $C_{18-30}$cyclohydrocarbo moieties such as those comprising three fused six member rings such as represented below by Formula A:

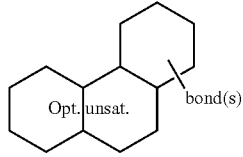

Formula A

"opt. unsat." Indicates that any of the rings in the moiety of Formula A may further comprise from none to three C=C bonds (preferably two C=C) which may or may not be conjugated and/or aromatic and where "bond(s)" indicates that moiety of Formula A is a uni or multi valent radical.

It will be appreciate that to represent the acids of interest the moiety of Formula A may be further substituted in any suitable position with H, one or more carboxy groups (preferably one COOH)) and optionally one or more further suitable organo substituents (preferably at least one $C_{1-4}$hydrocarbo group, more preferably from one to four $C_{1-4}$alkyl groups).

The most common unsaturated cyclic mono acid present in Rosin is abietic acid ($C_{19}H_{29}COOH$ molecular weight 302) (abieta-7,13-dien-18-oic acid or 13-isopropylpodocarpa-7,13-dien-15-oic acid) (structure shown below) which makes up 25% to 60% of most tall oils.

Other derivatives and/or isomers of abietic acid commonly present in Rosin to some extent include neoabietic acid, dehydroabietic acid, palustric acid and levopimaric acid. Typically about 50 to 70% of the different acids present in Rosin can (if necessary after isomerisation) react in a Diels Alder reaction.

Typical Rosins comprise the following specific acids in various proportions depending on the Rosin source plus up to 10% by weight of Rosin of other, different components commonly referred to as "non esterifible" (such as terpenes and the like). For convenience these acids can be divided into the three groups below:

Abietic type

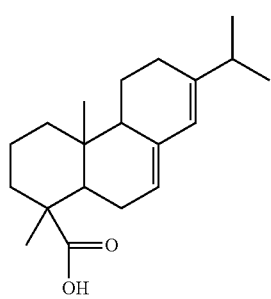

Abietic acid

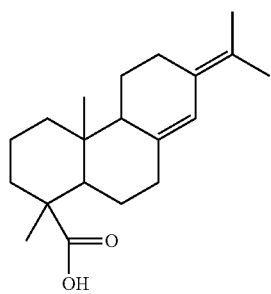

Neoabietic acid

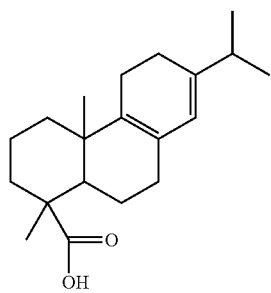

Palustric acid

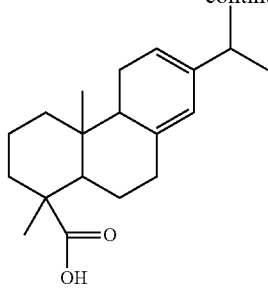

Levopimaric acid

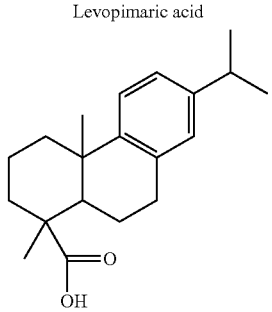

Dehydroabietic acid

Pimaric type

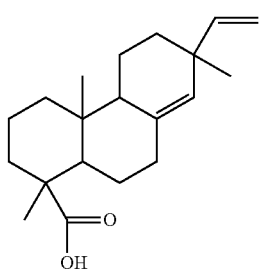 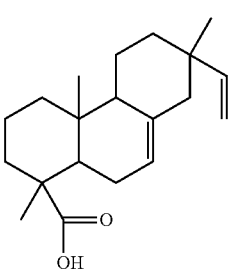

Pimaric acid    Isopimaric acid

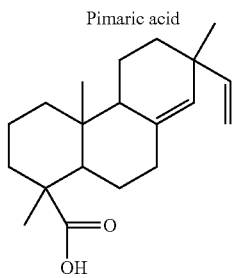

Sandracopimaric acid

Labdane type

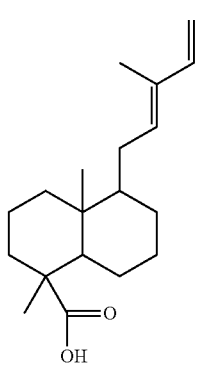

Labane acid

Preferred rosin acids that may comprise Component A are selected from the group consisting of: abietic acid, palustric acid, levopimaric acid, sandaracopimaric acid and/or mixtures thereof.

Preferably the Diels Alder reactable component of the Rosin comprise from 40 to 80% by weight of the Rosin.

It is believed that levopimaric acid is advantageously capable of undergoing a Diels Alder reaction and therefore in one embodiment of the invention Component A comprises levopimaric acid and components that may act as a precursor for levopimaric acid (for example. by isomerisation or other transformation e.g. under the conditions of the first step of the first reaction of the invention). Such levopimaric acid precursors may include for example abietic, palustric and/or sandaracopimaric acids. Rosins comprising a high proportion of levopimaric acid and precursors thereof are thus preferred. Typical Rosins have a levopimaric acid and precursor content of from 50 to 70% by weight of Rosin.

Usefully Component A if present may be present in the compositions and/or resins of the invention in an amount of at least 5 wt-%, more usefully at least 8 wt-%, even more usefully at least 10 wt-% and most usefully at least 15 wt-%, based on the total weight of components (A) to (D) and optionally (B1) and/or (D1) used to prepare the resin being 100%.

Conveniently Component A may be present in the compositions and/or resins of the invention in an amount of less than 28 wt-%, more conveniently less than 25 wt-%, even more conveniently less than 20 wt-%, most conveniently less than 17 wt-%, based on the total weight of components (A) to (D) and optionally (B1) and/or (D1) used to prepare the resin being 100%.

Preferably Component A may be present in the compositions and/or resins of the invention in an amount of from 5 to 28 wt-%, more preferably from 8 to 25 wt-%, even more preferably from 10 to 20 wt-%, most preferably from 15 to 17 wt-%, for example 15.5 wt-% based on the total weight of components (A) to (D) and optionally (B1) and/or (D1) used to prepare the resin being 100%.

Component (B) (e.g. Oils and Fatty Acids)

It will be appreciated that there is a difference between a fatty acid and an oil both of which can be used herein as or to provide Component B. In the context of defining oil length, 'oil' has been used broadly to denote all hydrophobic liquid present in Components (A) to (E), however more typical oils that are largely used herein (which may also be referred to as "fatty acid oil") are unrefined natural products (that are liquid under standard conditions) and comprises one or more fatty acids—though fatty acids can also themselves be mixtures available as natural products. Thus for example linseed oil denotes a natural product, whereas linseed oil fatty acid denotes a mixture of fatty acids extracted from linseed oil.

Generally (unless the context dictates otherwise) as used herein the term fatty acid denotes a linear hydrocarbo carboxylic acid that comprises at least one ethylenically unsaturated double bond (i.e. unsaturation is implied in the fatty acid as this is needed for Component B). However saturated fatty acids may still be present in the compositions of the invention for other reasons. Preferred fatty acids are linear $C_{12-60}$hydrocarbo mono carboxylic acids comprising at least two ethylenically unsaturated double bonds, more preferably the at least two double bonds are conjugated. The term "fatty acid" also encompasses precursors for fatty acids, i.e. any component that under the conditions herein will transform and/or react to form a fatty acid.

The fatty acid of Component B may be capable of undergoing a Diels-Alder reaction in which case at least two conjugated double bonds are strongly preferred, or may be capable of undergoing a ene reaction in which case conjugated double bonds are not necessary (though may still be preferred)

For oxidatively drying alkyd resins, unsaturated fatty acids or oils having an iodine number of at least 100 cg/g, preferably from 120 to 200 cg/g, are preferred where isolated and conjugated double bonds may be present. They are obtained, for example, from natural sources, such as soy oil, fish oil, sunflower oil, linseed oil, safflower oil, and cottonseed oil or originate from tall oil distillation. Fatty acids having conjugated double bonds are obtained by catalytic isomerisation of natural fatty acids, from tung oil, calendula oil and/or from dehydrated castor oil. Conjugated oil is preferably obtained by Isomerisation of non-conjugated fatty acids and/or by dehydration of castor oil. The iodine number is defined according to DIN 53 241-1 as the quotient of that mass $m_I$ of iodine which is added on to the olefinic double bonds, with decolourisation, of a sample to be analysed and the mass $m_B$ of this sample (mass of the solid in the sample in the case of solutions or dispersions); its conventional unit is "g/(100 g)" or "cg/g". In addition, saturated oils or saturated fatty acids having 10 to 22 carbon atoms can be used in part or completely, as long as oxidative drying of the resin obtained is not impaired.

Suitable non-limiting examples of fatty acids and/or oils that may comprise Component B are given below with the systematic and trivial names:

(Z)-tetradecan-9-enoic(myristoleic acid) ($C_{14}H_{26}O_2$)
$CH_3(CH_2)_3CH{=}CH(CH_2)_7COOH$

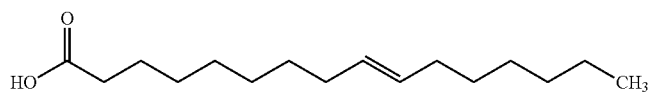

n-hexadecan-9-enoic acid (palmitoleic acid) ($C_{16}H_{30}O_2$)

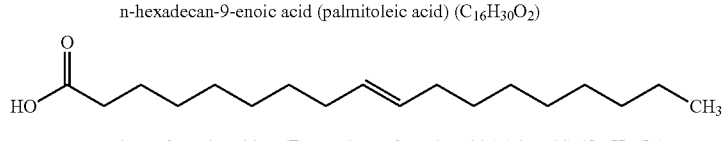

n-octadecan-9-enoic acid or (Z)-octadecan-9-enoic acid (oleic acid) ($C_{18}H_{34}O_2$)

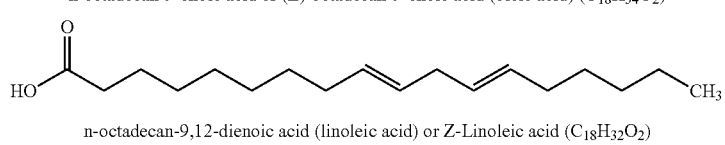

n-octadecan-9,12-dienoic acid (linoleic acid) or Z-Linoleic acid ($C_{18}H_{32}O_2$)

n-octadecan-9,12,15-trienoic acid (linolenic acid) ($C_{18}H_{30}O_2$)

n-eicosan-5,8,11,14-tetraenoic acid (arachidonic acid) ($C_{20}H_{32}O_2$)

Eleostearic acid, (ELA or α-eleostearic acid, $C_{18}H_{30}O_2$ (9E,11E,13Z)-octadeca-9,11,13-trienoic acid) is a conjugated linolenic acid which forms about 60 to 80% of the fatty acids in tung oil and Calendula oil. ELA has the following structure:

Isomers of ELA include β-eleostearic acid ((9E,11E,13E)-octadeca-9,11,13-trienoic acid) and alpha-linolenic acid (ALA).

Licanic acid, $C_{18}H_{28}O_3$ (9Z,11E,13E)-4-oxooctadeca-9,11,13-trienoic acid has the following structure:

Ricinoleic acid (12-hydroxy-9-cis-octadecenoic acid or (9Z,11E,13E)-4-oxooctadeca-9,11,13-trienoic acid) is an unsaturated omega-9 fatty acid that forms about 90% of the fatty acid content in castor oil.

(Z)-docos-13-enoic acid (erucic acid) $C_{22}H_{42}O_2$ is a monounsaturated omega-9 fatty acid found as about 40 to 50% of the fatty acid content of rapeseed, wallflower seed, and mustard seed. Erucic acid is also known as cis-13-docosenoic acid or (Z)-docos-13-enoic acid and the trans isomer is known as brassidic acid. Erucic acid has structure:

(Z)-eicosan-9-enoic acid (gadoleic acid) $C_{20}H_{38}O_2$
Eicosapentaenoic acid (EPA) (C20)
$CH_3CH_2CH=CHCH_2CH=CHCH_2CH=CHCH_2CH=CHCH_2CH=CH(CH_2)_3COOH$ Docosapentaenoic acid designates any straight chain 22:5 fatty acid. Two isomers are commonly available.

All-cis-7,10,13,16,19-docosapentaenoic acid (or 7Z,10Z, 13Z,16Z,19Z)-docosan-7,10,13,16,19-pentaenoic acid) is an ω(omega)-3 fatty acid with the trivial name clupanodonic acid, (commonly called DPA) and is available from seal oil.

The isomer all-cis-4,7,10,13,16-docosapentaenoic acid is an ω-6 fatty acid with the trivial name Osbond acid and may be formed by an elongation and desaturation of arachidonic acid.

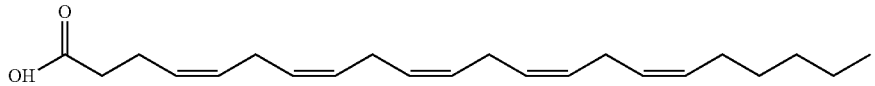 [SMILES: CCCCC/C=C\C/C=C\C/C=C\C/C=C\C/C=C\CCC(=O)O]

Docosahexaenoic acid (DHA) (C22)
CH$_3$CH$_2$CH=CHCH$_2$CH=CHCH$_2$CH=CHCH$_2$CH=CHCH$_2$CH=CHCH$_2$CH=CH(CH$_2$)$_2$COOH The Fatty acids can also be grouped according to their degree of unsaturation.

Mono unsaturated fatty acids may comprise: palmitoleic, ricinoleic, oleic, myristoleic, erucic and/or gadoleic acids Di-unsaturated fatty acids may comprise: linoleic acid Tri-unsaturated fatty acids may comprise: linolenic acid, α(alpha)-eleostearic acid (ELA), β(beta)-eleostearic acid, α(alpha)-linolenic acid (ALA) and/or licanic acid.

Tetra-unsaturated fatty acids may comprise: arachidonic acid.

Penta-unsaturated fatty acids may comprise: eicosapentaenoic acid (EPA), clupanodonic acid (DPA) and/or osbond acid Hex-unsaturated fatty acids may comprise docosahexaenoic acid (DHA)

Those unsaturated fatty acids listed above with two or more double bonds (i.e. not mono unsaturated) are more preferred.

Other specific structures of suitable fatty acids (or precursors therefor) that may comprise Component B are given below:

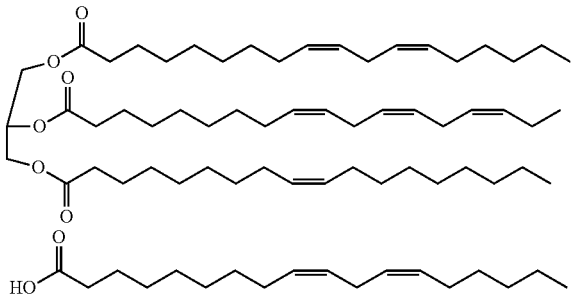

The fatty acids (including oils) that may comprise Component B may be obtained from any suitable source, more preferably a renewable non-fossil source, most preferably from tung oil, calendula oil and/or linseed oil, for example tung oil.

Usefully Component B may comprise at least one fatty acid and/or oil selected from the group consisting of: palmitoleic acid, ricinoleic acid, oleic acid, myristoleic acid, erucic acid, gadoleic acid, linoleic acid, linolenic acid, α(alpha)-eleostearic acid (ELA), β(beta)-eleostearic acid, α(alpha)-linolenic acid (ALA), licanic acid, arachidonic acid, eicosapentaenoic acid (EPA), clupanodonic acid (DPA), osbond acid, docosahexaenoic acid (DHA) and/or suitable esters thereof (preferably glycerol esters) and/or suitable mixtures thereof.

More usefully Component B may comprise at least one fatty acid selected from the group consisting of: linoleic acid, linolenic acid, ELA, β(beta)-eleostearic acid, ALA, licanic acid, arachidonic acid, EPA, DPA, osbond acid, DHA and/or suitable mixtures thereof.

Most usefully Component B may comprise at least one fatty acid selected from the group consisting of: linoleic acid, linolenic acid, ELA, β(beta)-eleostearic acid, ALA and/or suitable mixtures thereof.

Other suitable fatty acids that may comprise Component B (and/or B1) are any of those described and sourced in WO08-101722 page 10 line 22 to page 11 line 26 and this passage is hereby incorporated herein by reference.

Particularly advantageous resins may be obtained when Component B comprises at least 80% by weight selected from the group consisting of unsaturated oils such as soybean oil, tall oil, tung oil, calendula oil, rosin, sunflower oil, dehydrated castor oil, linseed oil, corresponding fatty acids (for example tung oil fatty acid, tall oil fatty acid or soybean fatty acid), corresponding esters (for example rosin esters, or tung oil fatty acid esters) and mixtures thereof. This group encompasses mixtures of the members of the group, such as mixtures comprising various types of the same class of compounds (for example soybean oil together with tung oil), mixtures comprising same types of different classes of compounds (for example tung oil together with tung oil fatty acid), and mixtures comprising various types of different classes of compounds (for example tung oil together with soybean fatty acid and rosin esters). Preferably the unsaturated oils and derived fatty acids and esters are more folded unsaturated oils and derivates, i.e. oils, fatty acids or esters having two, three or more double bonds. More preferred Component B may comprise tall oil, tung oil, calendula oil, rosin, sunflower oil, dehydrated castor oil, linseed oil, corresponding fatty acids (for example tung oil fatty acid or soybean fatty acid), and corresponding esters (for example rosin esters, or tung oil fatty acid esters).

The most preferred Component B is soybean fatty acid and/or tung oil, with a resin according to the invention preferably comprising Component B with at least 80% by weight of tung oil. Preferably Component B is substantially tung oil. By substantially tung oil is here meant that only smaller amounts of other fatty acids are present in Component B, which comprises more than 95% by weight of tung oil, more preferably more than 98% by weight of tung oil.

Preferably Component B has at least one eleostearic moiety. Herein by eleostearic moiety it is meant a moiety that consists of 3 conjugated double bonds. Examples of Component B containing such moieties include among others eleostearic acid, tung oil or calendula oil. These have in their structure one or more eleostearic moieties. When Component B contains an eleostrearic moiety this is advantageous as it results in a much better air-drying performance than a non-eleostearic moiety containing Component B. In this case even if some of the double bonds are reacted after grafting, there is an activated hydrogen formed that insures the air-drying of the grafted autoxidisable polyester resin.

Tung oil is composed primarily of eleostearic acid which is an 18 carbon fatty acid having three conjugated double bonds (an eleostearic moiety). This structure is advantageous because after the Diels Alder reaction of the eleostearic moiety of for example tung oil with the diacid or anhydride. Without wishing to be bound by any mechanism the applicant believes that an activated hydrogen may be formed, as shown below:

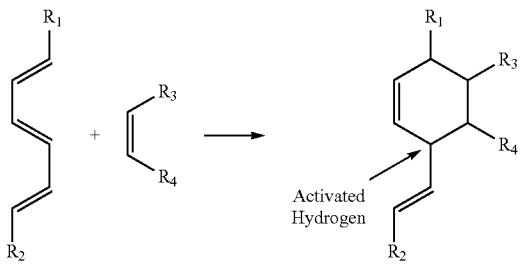

where $R_1$ and $R_2$ are rest of oil (fatty acid chain) and $R_3$ and $R_4$ are part of the diacid or anhydride.

Usefully Component B may be present in the compositions and/or resins of the invention in an amount of at least 30 wt-%, more usefully at least 35 wt-%, even more usefully at least 40 wt-% and most usefully at least 50 wt-%, based on the total weight of components (A) to (D) and optionally (B1) and (D1) used to prepare the resin being 100%.

Conveniently Component B may be present in the compositions and/or resins of the invention in an amount of less than 75 wt-%, more conveniently less than 70 wt-%, even more conveniently less than 65 wt-%, most conveniently less than 60 wt-%, based on the total weight of components (A) to (D) and optionally (B1) and (D1) used to prepare the resin being 100%.

Preferably Component B may be present in the compositions and/or resins of the invention in an amount of from 30 to 75 wt-%, more preferably from 35 to 70 wt-%, even more preferably from 40 to 65 wt-%, most preferably from 50 to 60 wt-%, for example from 55 to 58 wt %, e.g. 56.7 wt-% based on the total weight of components (A) to (D) and optionally (B1) and (D1) used to prepare the resin being 100%.

Component (C) (e.g. Itaconic Acid)

Component C is an unsaturated diacid, esters thereof (mono and/or di esters) and/or anhydrides thereof, being reactive as a dienophile with components A (Rosin) and/or B (Fatty acid). Preferred acids and derivatives have from 5 to 6 carbon atoms and more preferably 5 carbon atoms.

Mono unsaturated diacids of formula $C_5H_6O_4$ that may usefully comprise Component C may comprise: itaconic acid

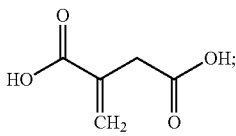

citraconic acid

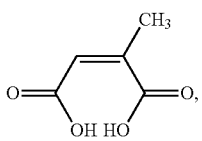

glutaconic acid

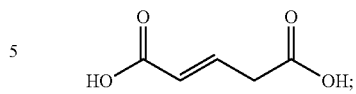

and/or mesaconic acid

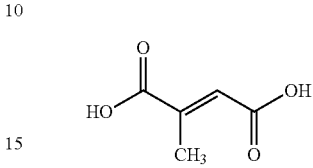

Component C may also usefully comprise the anhydrides and/or esters (such as $C_{1-10}$alkyl esters) of the aforementioned diacids.

More usefully Component C is selected from itaconic acid, itaconic anhydride, citraconic acid, citraconic anhydride and/or mixtures thereof.

Preferred acid dienophilic monomers of Component C may comprise Itaconate functional monomers that may be represented generally by Formula 1:

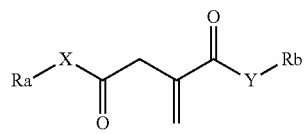

Formula 1 where Ra and Rb independently represent any optionally substituted hydrocarbo moiety (such as any aliphatic, cycloaliphatic or aromatic moieties) and/or H; and
X and Y independently represent —O— and/or —NRc-, where Rc independently in each case represents H and/or any optionally substituted hydrocarbo moiety (such as any aliphatic, cycloaliphatic or aromatic moieties);
with the proviso that:
at least one of Ra and X and/or Rb and Y together represent OH and/or any precursor acid group, that is a group which readily generates an acid group under the conditions herein (such as an anhydride group).

When X and Y are both O, Formula 1 represents 2-methylidenebutanedioic acids and/or mono or diesters.

When one of X and Y are NRc, Formula 1 represents itaconate amide.

When one or X or Y is O and the other is NRc Formula 1 represents a compound having one carboxylic acid or ester group and one amide group.

It will be appreciated that the term itaconate functional monomer(s) as used herein denotes any itaconate diacid, monoacid, diester, monoester, diamide and/or monoamide of Formula 1 (as defined herein).

Preferred itaconate functional monomers are those of Formula 1 where Ra and Rb independently represent:
optionally substituted $C_{1-30}$hydrocarbyl,
more preferably $C_{1-20}$alkylene (which may comprise linear, branched and/or cyclic moieties) and/or $C_{3-20}$arylene;
most preferably $C_{1-10}$alkylene.

Whilst Ra and Rb may be different, more conveniently they represent identical moieties.

Conveniently Formula 1 may represent mono alkyl or aryl esters of itaconic acid, mono alkyl or aryl amides of itaconic acid. More conveniently Ra and Rb may be independently selected from the group consisting of: methyl, ethyl, i-propyl, n-butyl, i-butyl, t-butyl, hexyl, cyclohexyl, 2-ethylhexyl, decyl, dodecyl, phenyl, 2-phenylethyl, 2-hydroxyethyl, 2-hydroxypropyl, 3-hydroxypropyl, and 4-hydroxybutyl. More conveniently Ra and Rb are selected from: methyl, ethyl, n-butyl and 2-ethylhexyl. Most conveniently Ra and Rb are selected from methyl and ethyl for example methyl.

Usefully Component C may be present in the compositions and/or resins of the invention in an amount of at least 2 wt-%, more usefully at least 5 wt-%, even more usefully at least 10 wt-% and most usefully at least 12 wt-%, based on the total weight of components (A) to (D) and optionally (B1) and/or (D1) used to prepare the resin being 100%.

Conveniently Component C may be present in the com-positions and/or resins of the invention in an amount of less than 28 wt-%, more conveniently less than 25 wt-%, even more conveniently less than 20 wt-%, most conveniently less than 15 wt-%, based on the total weight of components (A) to (D) and optionally (B1) and/or (D1) used to prepare the resin being 100%.

Preferably Component C may be present in the compositions and/or resins of the invention in an amount of from 2 to 28 wt-%, more preferably from 5 to 25 wt-%, even more preferably from 10 to 20 wt-%, most preferably from 12 to 15 wt-%, for example 13 to 14 wt-%, e.g. 13.4 wt-% based on the total weight of components (A) to (D) and optionally (B1) and/or (D1) used to prepare the resin being 100%.

In one embodiment of the invention the itaconate functional monomer may be an itaconate ester of Formula 1 where at least one of Ra and Rb are independently optionally substituted $C_{1-3}$hydrocarbo groups such as $C_{1-3}$alkyl (the other of Ra and Rb optionally being H), an example of which is monomethyl itaconate (MMI).

In another embodiment of the invention the itaconate functional monomer may be an itaconate ester of Formula 1 where at least one of Ra and Rb are independently optionally substituted $C_{4-8}$hydrocarbo groups, such as $C_{4-6}$alkyl (the other of Ra and Rb optionally being H), an example of which is monobutyl itaconate (MBI).

Component (D) Polyols

Suitable polyols that may comprise Component D (and/or D1) are any of those described and sourced in WO08-101722 page 14 line 24 to page 16 line 11 and this passage is hereby incorporated herein by reference.

Component D may in principle comprise any hydroxy (i.e. OH group) functional compound or mixture of hydroxy functional compounds with a number average hydroxy functionality >2.0. By number average hydroxyl functionality is herein meant to take into account that even though the individual alcohol molecule has a discrete number of hydroxy groups, mixtures of alcohols typically will have a non-discrete medium hydroxy functionality. For example, one molecule may have a hydroxy functionality of 1 and another molecule may have a hydroxy functionality of 3. This will lead to a number average hydroxy functionality of 2.

In a preferred embodiment, Component D has a number average hydroxy functionality ≥2.5, even more preferred ≥2.8 and most preferred ≥3.

In a preferred embodiment, Component D has a number average hydroxy functionality of ≤15, preferably ≤10, more preferably ≤8, even more preferably ≤6, even more preferably ≤4.5 and most preferably ≤3.5, as this will allow for at least some of the alcohol to participate in crosslinking with neighboring or the same polymer molecule.

Component D may comprise aliphatic parts and/or aromatic parts dependent on the required properties of the resin. In one preferred embodiment it was surprisingly found that when the alcohol comprises at least one aliphatic ring, then the resulting resin tend to have an increased hardness.

Component D may comprise other functional groups, such as for example one or more acid groups, amine groups, urea groups, ester groups, unsaturations etc. However, it is preferred Component D has only limited number of other functional groups.

The term polyol and/or alcohol as used herein denotes both individual (pure) alcohols as well as mixtures of alcohols unless otherwise stated. The individual alcohols preferably have a functionality of at least 2 to ensure that the alcohol does not act as an endcap group. The alcohol may be a mixture of several alcohols with the same or varying functionality (hydroxy and/or other functional groups).

In a preferred embodiment, at least 50 weight % of Component D has a hydroxy functionality ≥3, more preferably ≥4. More preferably at least 50 weight % of the alcohol has three functional groups, even more preferably at least 50 weight % of the alcohol has four functional groups. Particularly, it was found to be advantageous to utilize an alcohol, wherein at least 80 weight % of the alcohol has a hydroxy functionality ≥3, more preferably ≥4. More preferably at least 80 weight % of the alcohol has three functional groups, even more preferably at least 80 weight % of the alcohol has four functional groups. In a particularly preferred embodiment, the functionality of the alcohol has substantially solely hydroxy functionality, such as at least 90 weight % of the alcohol has hydroxy functionality, or the alcohol has solely (i.e. 100 weight %) hydroxy functionality.

Preferably at least 50 weight % of the alcohol is selected from the group consisting of sorbitans, glycerol, tri methylol propane, pentaerythritol, di-pentaerythritol, tri-pentaerythritol, isosorbide, hydrogenated bisphenol A, ethylene glycol, propylene glycol, poly ethylene glycol, di ethylene glycol, neo pentyl glycol, sugars like for example cellulose, sucrose, fructose and alike, polyglycerols having from 2 to 10 OH groups and mixtures thereof. In a highly preferred embodiment, the alcohol consists substantially of one or more alcohols selected from the group consisting of glycerol, tri methylol propane, pentaerythritol, isosorbide, hydrogenated bisphenol A, ethylene glycol, propylene glycol, poly ethylene glycol, di ethylene glycol, neo pentyl glycol. By consisting substantially of is here meant that nearly all of the alcohol, such as more than 90 weight %, more than 95 weight % or more than 98 weight % of the alcohol is selected from the group consisting of glycerol, tri methylol propane, pentaerythritol, isosorbide, hydrogenated bisphenol A, ethylene glycol, propylene glycol, poly ethylene glycol, di ethylene glycol, neo pentyl glycol.

Particularly preferred polyols that may be useful as Component D may be selected from: glycerol

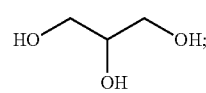

pentaerythritol

manitol, sorbitol, isosorbide, sorbitan and/or mixtures thereof. It is preferred that the polyol is from a biorenewable source.

Usefully Component D may be present in the compositions and/or resins of the invention in an amount of at least 2 wt-%, more usefully at least 5 wt-%, even more usefully at least 10 wt-% and most usefully at least 12 wt-%, based on the total weight of components (A) to (D) and optionally (B1) and/or (D1) used to prepare the resin being 100%.

Conveniently Component D may be present in the compositions and/or resins of the invention in an amount of less than 28 wt-%, more conveniently less than 25 wt-%, even more conveniently less than 20 wt-%, most conveniently less than 15 wt-%, based on the total weight of components (A) to (D) and optionally (B1) and/or (D1) used to prepare the resin being 100%.

Preferably Component D may be present in the compositions and/or resins of the invention in an amount of from 2 to 28 wt-%, more preferably from 5 to 25 wt-%, even more preferably from 10 to 20 wt-%, most preferably from 12 to 15 wt-%, for example 14.4 wt-% based on the total weight of components (A) to (D) and optionally (B1) and/or (D1) used to prepare the resin being 100%.

There is an increasing demand to use bio-renewable monomers in order to improve the sustainability of the resins used in for example coating applications. In view of concerns about depletion of fossil fuel resources or an increase in carbon dioxide in the air that poses a global-scale environmental problem in recent years, methods for producing raw materials of these polymers from biomass resources have attracted a lot of attention. Since these resources are renewable and therefore have a carbon-neutral biomass, such methods are expected to gain in particular importance in future. It is therefore a preferred feature of the present invention and the aspects described herein that where possible the components used herein as far as possible are biorenewable.

Preferably at least 20 wt-%, more preferably at least 30 wt-%, and especially 40 wt-% of the components (A) to (D) (and optionally (E) used to form the resin of the invention are derived from at least one bio-renewable material. Biorenewable materials may be obtained fully or in part from bio-renewable sources. Thus it is preferred to also measure the carbon-14 content to determine the biorenewability content of the components (A) to (D) (and optionally (E). The term bio-based is also used herein as a synonym for bio-renewable (as defined herein).

The content of carbon-14 (C-14) is indicative of the age of a bio-based material. It is known in the art that C-14, which has a half life of about 5,700 years, is found in bio-renewable materials but not in fossil fuels. Thus, "bio-renewable materials" refer to organic materials in which the carbon comes from non-fossil biological sources. Examples of bio-renewable materials include, but are not limited to, sugars, starches, corns, natural fibres, sugarcanes, beets, citrus fruits, woody plants, cellulosics, lignocelluosics, hemicelluloses, potatoes, plant oils, other polysaccharides such as pectin, chitin, levan, and pullulan, and a combination thereof. C-14 levels can be determined by measuring its decay process (disintegrations per minute per gram carbon or dpm/gC) through liquid scintillation counting. In one embodiment of the present invention, polymer A and or polymer B comprise at least about 1.5 dpm/gC (disintegrations per minute per gram carbon) of carbon-14, more preferably at least 2 dpm/gC, most preferably at least 2.5 dpm/gC, and especially at least 4 dpm/gC.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen and/or sulphur, more preferably from hydrogen, nitrogen, oxygen and/or sulphur.

The term 'hydrocarbo group' as used herein is a sub-set of a organic group and denotes any univalent or multivalent moiety (optionally attached to one or more other moieties) which consists of one or more hydrogen atoms and one or more carbon atoms. Hydrocarbo groups may comprise one or more of the following groups. Hydrocarbyl groups comprise univalent groups formed by removing a hydrogen atom from a hydrocarbon. Hydrocarbylene groups comprise divalent groups formed by removing two hydrogen atoms from a hydrocarbon the free valencies of which are not engaged in a double bond. Hydrocarbylidene groups comprise divalent groups (represented by "R2C=") formed by removing two hydrogen atoms from the same carbon atom of a hydrocarbon, the free valencies of which are engaged in a double bond; Hydrocarbylidyne groups comprise trivalent groups (represented by "RC≡"), formed by removing three hydrogen atoms from the same carbon atom of a hydrocarbon the free valencies of which are engaged in a triple bond. Hydrocarbo groups may also comprise any saturated, unsaturated double and/or triple bonds (e.g. alkenyl, and/or alkynyl respectively) and/or aromatic groups (e.g. aryl) and where indicated may be substituted with other functional groups.

Most preferably organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group):

The term 'alkyl' or its equivalent (e.g. 'alk') as used herein may be readily replaced, where appropriate and unless the context clearly indicates otherwise, by terms encompassing any other hydrocarbo group such as those described herein.

Any substituent, group or moiety mentioned herein refers to a monovalent species unless otherwise stated or the context clearly indicates otherwise (e.g. an alkylene moiety may comprise a bivalent group linked two other moieties). A group which comprises a chain of three or more atoms signifies a group in which the chain wholly or in part may be linear, branched and/or form a ring (including spiro and/or fused rings). The total number of certain atoms is specified for certain substituents for example $C_{1-m}$ organo, signifies an organic group having from 1 to m carbon atoms. In any of the formulae herein if one or more ring substituents are not indicated as attached to any particular atom on the ring, the substituent may replace any hydrogen atom attached to a ring atom and may be located at any available position on the ring which is chemically suitable.

Preferably any of organic groups listed above comprise from 1 to 36 carbon atoms, more preferably from 1 to 18. It is particularly preferred that the number of carbon atoms in an organic group is from 1 to 10 inclusive.

Unless the context clearly indicates otherwise, as used herein plural forms of the terms herein are to be construed as including the singular form and vice versa.

The term 'effective' (for example with reference to the process, uses, products, materials, compounds, monomers, oligomers, polymer precursors and/or polymers of the present invention) will be understood to refer to those ingredients which if used in the correct manner provide the required properties to the material, compound, composition, monomer, oligomer, polymer precursor and/or polymer to which they are added and/or incorporated in any one or more of the uses and/or applications described herein. As used herein the term "suitable" denotes that a functional group is compatible with producing an effective product.

The substituents on the repeating unit may be selected to improve the compatibility of the materials with the polymers and/or resins in which they may be formulated and/or incorporated to form an effective material. Thus, the size and length of the substituents may be selected to optimise the physical entanglement or interlocation with the resin or they may or may not comprise other reactive entities capable of chemically reacting and/or cross-linking with such other resins.

Certain moieties, species, groups, repeat units, compounds, oligomers, polymers, materials, mixtures, compositions and/or formulations which comprise some or all of the invention as described herein may exist as one or more stereoisomers (such as enantiomers, diastereoisomers, geometric isomers, tautomers and/or conformers), salts, zwitterions, complexes (such as chelates, clathrates, crown compounds, cyptands/cryptades, inclusion compounds, intercalation compounds, interstitial compounds, ligand complexes, non-stoichiometric complexes, organometallic complexes, π-adducts, solvates and/or hydrates); isotopically substituted forms, polymeric configurations [such as homo or copolymers, random, graft or block polymers, linear or branched polymers (e.g. star and/or side branched polymers), hyperbranched polymers and/or dendritic macromolecules (such as those of the type described in WO 93/17060), cross-linked and/or networked polymers, polymers obtainable from di and/or tri-valent repeat units, dendrimers, polymers of different tacticity (e.g. isotactic, syndiotactic or atactic polymers)]; polymorphs [such as interstitial forms, crystalline forms, amorphous forms, phases and/or solid solutions] combinations thereof where possible and/or mixtures thereof. The present invention comprises all such forms which are effective.

Another aspect of the invention broadly provides a coating composition comprising the polymers of the present invention and/or as described herein.

A further aspect of the invention provides a coating obtained or obtainable from a coating composition of the present invention.

A yet other aspect of the invention broadly provides a substrate and/or article having coated thereon an (optionally cured) coating composition of the present invention.

A yet further aspect of the invention broadly provides a method of using polymers of the present invention and/or as described herein to prepare a coating composition.

A still further aspect of the invention broadly provides a method for preparing a coated substrate and/or article comprising the steps of applying a coating composition of the present invention to the substrate and/or article and optionally curing said composition in situ to form a cured coating thereon. The curing may be by any suitable means, such as thermally, by radiation and/or by use of a cross-linker.

Preferred coating compositions are solvent coating compositions or aqueous coating compositions, more preferably are aqueous coating compositions.

Optionally aqueous coating compositions may also comprise a co-solvent. A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of polymers of the invention or may have been added during formulation of the aqueous composition.

The coating composition of the invention is particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The coating composition of the invention may be applied to a variety of substrates including wood, board, metals, stone, concrete, glass, cloth, leather, paper, plastics, foam and the like, by any conventional method including brushing, dipping, flow coating, spraying, and the like. The coating composition of the invention may also be used to coat the interior and/or exterior surfaces of three-dimensional articles. The carrier medium may be removed by natural drying or accelerated drying (by applying heat) to form a coating.

The coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents, waxes, neutralising agents, adhesion promoters, defoamers, co-solvents, wetting agents and the like introduced at any stage of the production process or subsequently. It is possible to include fire retardants (such as antimony oxide) to enhance the fire retardant properties.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

The object of the present invention is to solve some or all of the problems or disadvantages (such as identified herein) with the prior art.

Unless the context clearly indicates otherwise, as used herein plural forms of the terms herein are to be construed as including the singular form and vice versa.

The term "comprising" as used herein will be understood to mean that the list following is non exhaustive and may or may not include any other additional suitable items, for example one or more further feature(s), component(s), ingredient(s) and/or substituent(s) as appropriate.

The terms 'effective', 'acceptable' 'active' and/or 'suitable' (for example with reference to any process, use, method, application, preparation, product, material, formulation, compound, monomer, oligomer, polymer precursor, and/or polymers described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

Preferred utility of the resin and coating compositions of the present invention is use in decorative applications such as paints and/or to form a coating such as a water-borne, solvent-borne or powder coating.

In one embodiment of the present invention provides powder coating compositions comprising alkyd resins of the present invention.

The term "powder" as used herein indicates a composition that comprises a collection of loose solid particles wherein the individual particles have a maximum particle size of at most 130 μm at 23° C. and at atmospheric pressure, for example a particle size of at most 110 μm, for example of at most 90 μm at 23° C. and at atmospheric pressure. A powder that is in a form suitable for application to a substrate as a coating (optionally formulated with other ingredients) is also referred to herein as a 'powder coating composition', although such compositions depending on the context, can also just be referred to herein as 'powders'. The term 'powder coating' as used herein is the partially or fully cured (crosslinked) form of the powder coating composition of the invention after it has been applied to a substrate. In other words the powder coating is derived upon partial or full cure of a powder coating composition (or powder)

Powders of the invention may have some or all of the following general characteristics. Powders are dry, finely divided, free flowing, solid materials at room temperature and at atmospheric pressure. Powders are benign to the user and the environment since they are virtually free of volatile organic solvents and emit little, if any, volatile materials when cured. Powders are also clean and convenient to use since they are applied to the substrate in dry solid form. Powders are easily collected if spilt and do not require special cleaning or containment supplies, so improving working hygiene. Powders are essentially 100% recyclable since sprayed powders can be fully reclaimed and recombined with fresh powder feed. Powder coating compositions can be prepared ready to use as no thinning or dilution is required before coating.

Powders of the invention comprise finely divided particles of the alkyd resins of the present invention. Optionally if the powder is a thermosetting powder, the composition may also comprise a cross-linker. Powders also usually contain pigments, fillers, and other additives. After application to the substrate, the individual powder particles are melted in an oven and coalesce to form the powder coating as a continuous film. Powder coatings have decorative and protective properties associated with conventional organic coatings. Powders are applied by fusion-coating processes as during the coating process the powder particles are fused or melted. Although this is usually carried out in a convection oven, infrared, resistance, and induction heating methods have also been used. Therefore, with minor exceptions, powder coatings are usually applied in factories using fixed installations and are less commonly used in repair or maintenance applications. Powders are typically applied to a substrate using an electrostatic spray process; the powder being dispersed in an air stream and passed through a corona discharge field where the particles acquire an electrostatic charge. The charged particles are attracted to and deposited on the grounded object to be coated. The object (usually sprayed at room temperature), is then placed in an oven where the powder melts to forms a powder coating. A hybrid application process has also been developed using a combination of high voltage electrostatic charging and fluidized-bed techniques (such as electrostatic fluidized bed). Powders have also been applied by triboelectric methods. Powders are widely used to coat many familiar items such as lawn and garden equipment, patio and other metal furniture, electrical cabinets, lighting, shelving, store fixtures and many automotive components. Powder coatings are widely used with thousands of installations in the factories of original equipment manufacturers (OEMS) and custom coating job shops.

Powder coating compositions can be thermosetting or thermoplastic. Preferably the powders of the present invention are thermosetting powder coating compositions. The preparation of thermosetting powder coating compositions is described by Misev in "Powder Coatings, Chemistry and Technology" (pp. 224-300; 1991, John Wiley).

Alkyd resins of the invention that are particularly suitable for use in a powder coating composition of the invention are those alkyd resins that are solid at 23° C. and at atmospheric pressure (=1 atm) (e.g. under Standard Conditions).

In preferred powder coating compositions the glass transition temperature ($T_g$) of the resin is at least 40, more preferably at least 42, even more preferably at least 45, most preferably at least 48, for example at least 50° C. The glass transition temperature ($T_g$) of the resin is preferably at most 100, more preferably at most 90 even more preferably at most 80, most preferably at most 75, for example at most 70° C.

The glass transition temperature ($T_g$) of the uncured (optionally thermosetting) powder coating composition of the invention is preferably at least 20° C., more preferably at least 25° C., even more preferably at least 35° C., most preferably at least 45° C. The glass transition temperature ($T_g$) of the uncured thermosetting powder coating composition is preferably at most 100° C., more preferably at most 90° C., even more preferably at most 80° C., most preferably at the most 70° C.

In the discussion of the invention herein, unless stated to the contrary, the disclosure of alternative values for the upper and lower limit of the permitted range of a parameter coupled with an indicated that one of said values is more preferred than the other, is to be construed as an implied statement that each intermediate value of said parameter, lying between the more preferred and less preferred of said alternatives is itself preferred to said less preferred value and also to each less preferred value and said intermediate value.

For all upper and/or lower boundaries of any parameters given herein, the boundary value is included in the value for each parameter. It will also be understood that all combinations of preferred and/or intermediate minimum and maximum boundary values of the parameters described herein in various embodiments of the invention may also be used to define alternative ranges for each parameter for various other embodiments and/or preferences of the invention whether or not the combination of such values has been specifically disclosed herein.

It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

The term "substantially" as used herein may refer to a quantity or entity to imply a large amount or proportion thereof. Where it is relevant in the context in which it is used "substantially" can be understood to mean quantitatively (in relation to whatever quantity or entity to which it refers in the context of the description) there comprises an proportion of at least 80%, preferably at least 85%, more preferably at least 90%, most preferably at least 95%, especially at least 98%, for example about 100% of the relevant whole. By analogy the term "substantially-free" may similarly denote that quantity or entity to which it refers comprises no more than 20%, preferably no more than 15%, more preferably no more than 10%, most preferably no more than 5%, especially no more than 2%, for example about 0% of the relevant whole.

Compositions of and/or used in the present invention may also exhibit improved properties with respect to known compositions that are used in a similar manner. Such improved properties may be (preferably as defined below) in at least one, preferably a plurality, more preferably three of more of those propert(ies) described herein. Preferred compositions of and/or used in the present invention, may exhibit comparable properties (compared to known compositions and/or components thereof) in two or more, preferably three or more, most preferably in the rest of those properties described herein.

Improved properties (or improvement) as used herein means the value of the component and/or the composition of and/or used in the present invention is >+8% of the value of the known reference component and/or composition described herein, more preferably >+10%, even more preferably >+12%, most preferably >+15%.

Comparable properties as used herein means the value of the component and/or composition of and/or used in the present invention is within +/−6% of the value of the known reference component and/or composition described herein, more preferably +/−5%, most preferably +/−4%.

The percentage differences for improved and comparable properties herein refer to fractional differences between the component and/or composition of and/or used in the invention and the known reference component and/or composition described herein where the property is measured in the same units in the same way (i.e. if the value to be compared is also measured as a percentage it does not denote an absolute difference).

In particular Reduced Yellowing is defined herein to show an improvement (i.e. less) yellowing with respect to a Reference Coating (as described herein) as measured by Δb values taken after at least one week (preferably after three weeks) where the Δb values of the coatings of the invention are improved (lower) by the percentages stated above to indicate improvements. Preferably Reduced Yellowing results in improved or comparable performance (with respect to the Reference Coating as defined herein) in at least one (preferably all of) the following properties: gloss, hardness, low VOC, DFT, and/or TFT.

The Reference Coating is prepared as nearly identical as practical to the coating of the invention that is tested with the exception that in Reference Coating the Component C (whether present as a monomer and/or as diluent) is replaced by the same weight of maleic acid, anhydride and/or ester (from same alcohol as for Component C) depending whether Component C is an acid, anhydride or ester. If Component C is a mixture then the Reference Coating is prepared from the same weight of maleic acid as the total amount of the Component C mixture.

Thus in one embodiment of the present invention the alkyd resins and/or blends of the present invention when applied to a substrate as a coating (Invention Coating) exhibit Reduced Yellowing with respective a reference coating, where: Reduced Yellowing is defined as the Invention Coating having a Δb value of at least 6% lower than the Δb of a Reference Coating, and where Δb is a measure the increase in yellow colour over time and is defined as the difference in the b-values (measured as described in the Yellowing test method described herein) of a coating immediately after application and the same coating measured one week after the coatings were applied; and the Reference Coating is defined as a coating prepared from a composition identical to that used to prepare the Invention Coating with the exception that all Component C used in the Invention Coating (whether present as a monomer and/or as diluent) is replaced by the same total weight of maleic acid, anhydride and/or ester (from same alcohol as for Component C) depending whether Component C is an acid, anhydride or ester.

Therefore a still further aspect of the invention broadly provides a method for preparing a coating having Reduced Yellowing (as defined above) the method comprising the steps of (i) producing an alkyd resin of the invention using at least one Component C as a monomer; and/or (ii) blending an alkyd resin of the invention with at least one Component C as a diluent; and (iii) using the alkyd resin and/or the blend to prepare a coating having Reduced Yellowing.

Broadly a further aspect of the present invention provides use of a coating composition of the invention for the purpose of obtaining a coated substrate and/or article of the invention, where the coating thereon exhibits Reduced Yellowing; where Reduced Yellowing is defined as the coating having a Δb value of at least 6% lower than the Δb of a Reference Coating, Δb is a measure the increase in yellow colour over time and is defined as the difference in the b-values (measured in the Yellowing test method described herein) of a coating immediately after application and the same coating measured one week after the coatings were applied; and the Reference Coating is defined as a coating prepared from a composition identical to that used to prepare the coating composition of the invention, with the exception that all Component C used in the coating composition of the invention (whether present as a monomer and/or as diluent) is replaced by the same total weight of maleic acid, anhydride and/or ester (from same alcohol as for Component C) depending whether Component C is an acid, anhydride or ester.

Unless otherwise indicated all the tests herein are carried out under standard conditions as also defined herein.

Acid Number

The acid number (or AN) is given as the mass of potassium hydroxide (KOH) in milligrams that is required to neutralize one gram of the tested substance and is used as a measure of the concentration of carboxylic acid groups present. AN is determined conventionally by titration and/or using ASTM D974.

Assessment of Coating

Where indicated in some of the above tests, the performance of a coating can be assessed by assessing the damage to the coating. Damage is preferably assessed either by measuring the weight percentage of the coating left on the substrate after the test but the coating can also be evaluated visually using the rating scale below where 5 is the best and 1 is the worse:

5=very good: no visible damage or degradation/discoloration;
4=only slight visible damage or haze/blooming;
3=clear damage or haze/blooming;
2=coating partially dissolved/damaged;
1=very poor; coating is completely dissolved/damaged Carbon Double Bond Concentration The amount (in Milli-equivalents per g) of C=C in a sample is determined conventionally by titration.

Glass Transition Temperature ($T_G$)

Tg may be calculated theoretically according the Flory-Fox equation and/or measured by either one of the methods described below.

The $T_g$ may be measured by DSC using the TA Instruments DSC Q1000 with the standard TA Instruments alumina cups of 50 μl. The flow rate was 50 ml/min of nitrogen and the sample was loaded at a temperature range 20 to 25° C. The sample was equilibrated at 90° C. and then heated at a rate of 10° C./min to 100° C., kept for 5 minutes at 100° C., cooled to 90° C. at a rate of 20° C./min, kept for 5 minutes at 90° C. and subsequently heated at a rate of 10° C./min to 100° C.

In case the Tg of the alkyd resin could not be measured by DSC because the first derivative of the DSC curve does not show any identifiable maximum, an alternative method for determining the $T_g$ is by calculating the $T_g$ using the following equation that relates viscosity of the pure autoxidisable resin to its $T_g$ (derived from the Williams-Landau-Ferry (WLF) equation):

$$Ln(\eta)=27.6-[40.2\times(T-T_g)]/[51.6+(T-T_g)]$$

where:

Ln(η)=Natural logarithm of the viscosity of the pure autoxidisable resin expressed in Pa·s (measured at 23° C.±1° C. using a shear rate between 0.005 and 1 s$^{-1}$);

T=23° C.±1° C. (temperature used to measure the viscosity of the pure resin);

$T_g$=glass temperature.

Gloss Measurement Method:

Gloss measurements were carried out on a BYK Gardner micro TRI gloss 20 60 85 glossmeter in accordance with ASTM D523 89.

Iodine Number

The iodine value (also referred to herein as iodine number) is a measure of the amount of ethylenic unsaturated double bonds in a sample and increases with a greater degree of unsaturation. Iodine value may be defined according to DIN 53241 1 as the quotient of that mass ml of iodine which is added on to the olefinic double bonds, with decolourisation, of a sample to be analysed and the mass mB of this sample (mass of the solid in the sample in the case of solutions or dispersions). Iodine values may be quoted either in units of centigrams of iodine per gram of sample (cg $I_2$/g) or in units of grams of iodine per 100 gram of sample (g $I_2$/100 g) Standard methods for analysis may be used such as for example ASTM D5768-02(2006) and DIN 53241. One common method (and that used to measure the iodine values given herein) is the Wjjs method in which iodine absorption is determined by titrating unreact reagent with sodium thiosulfate and the iodine value is then calculated as follows:

$$\text{Iodine value} = \frac{(12.69)\times(\text{ml of thiosulfate})\times(\text{normality})}{\text{mass of sample (g)}}$$

König Hardness

König hardness was determined following DIN 53157 NEN 5319 using an Erichsen hardness equipment. The values are given in seconds (s). Preferably the unpigmented composition of the invention has a König hardness of at least 30 seconds after 4 weeks.

Molecular Weight Determination (Weight Average Mw):

Unless the context dictates otherwise, the molecular weights referred to in this application are weight average molecular weight (also denoted herein as Mw) as determined on an Alliance Waters 2695 GPC with two consecutive PL-gel columns, type Mixed-C, I/d=300/7.5 mm (Polymer Laboratories), size of column particles 10 μm, using stabilised tetrahydrofuran (THF) modified with 0.8% acetic acid as the eluent at 1 mL/min at 40° C. and using an Alliance Waters 2414 refractive index detector at 40° C. A set of polystyrene standards with a molecular weight range of 162 to 7.106 g/mol was used to calibrate the GPC equipment.

Molecular Weight Calculation (Number Average Mn):

Unless the context dictates otherwise where a number average molecular weight (also denoted herein as Mn) is measured using the same apparatus in the manner described above.

Particle Size

The particle size values given herein may be measured using a chromatographic technique in a Polymer Labs Particle Size Distribution Analyser (PSDA) and the values used herein are the volume mean. The particle sizes are quoted as a linear dimension which would be the diameter of an approximate spherical particle having the same volume as the volume mean measured.

Standard Conditions

As used herein, unless the context indicates otherwise, standard conditions (e.g. for drying a film) means a relative humidity of 50%±5%, ambient temperature (23° C.±2°) and an air flow of (less than or equal to) 0.1 m/s.

Drying Properties (Cotton Wool Dust Free Time (DFT) and Tack Free Time (TFT) Tests).

A cotton wool adhesion test measures the rate of surface drying of a coating film. The cotton wool adhesion test was conducted on a coating film applied with a 100 μm slit applicator on a glass plate. After applying the coating composition, a swatch of cotton wool (a loose ball of approximately 0.2 g and a diameter of approximately 3 cm) was dropped from a height of 5 cm on the paint film. After 10 seconds the glass panel was turned over 180° and it was observed if the cotton wool dropped off without leaving cotton fibres on the surface. When the cotton wool did not stick to the surface, the time was recorded as the dust free time. For the tack free time the same procedure was used, but now a weight of 1 kg was placed on the cotton wool. The tack free time was always determined after dust-free properties were reached.

Water Resistance:

A 100 μm wet film was cast on a Leneta chart and dried for 24 hours under standard conditions. Then three drops of water were placed on the film and one drop of water was removed after 30 minutes, a further after one hour and the final one after 3 hours. The water resistance was assessed immediately after removal of the water and after 24 hours. The rating for water resistance is from 0=very poor, dissolved, 3=up acceptable, 5=excellent, no damage of the coating.

Water resistance can also be measured quantatively using the following test. The composition to be tested is applied to a film as described above in the wet adhesion test. The coated test specimens were soaked in tap water at 40 degrees C. for seven days at room temperature (20 degree C.). The weight gain was recorded at end of this period (and at suitable intervals throughout) to calculate the relative water uptake of the specimens. Other methods may also be used to evaluate the water resistance of compositions of the invention, such as the method described below.

Early water resistance may be measured in as follows. A 250 μm thick layer of the polymer coating to be tested is applied to a Leneta chart. The polymer is allowed to dry for 24 hours at room temperature to form a film coating. Three drops of water are applied to the film. The first drop is removed after 15 minutes, the second drop after 30 minutes and the third drop after 120 minutes. A film with excellent water resistance will not turn white nor will it blister, this rated "5". Poor water resistance, where the film either strongly whitens or blisters, is rated "0".

Yellowing:

Colour change due to yellowing is measured according to CieLab. A coating film is applied with a 100 μm slit applicator on a glass plate and dried for one week at room temperature. Then initial colour according to CieLab (L-value, a-value, b-value) is measured and b-value recorded. Next the film is stored in an oven at 50° C. for one week. Again colour is measured and change in b-value is recorded as Δb. The higher Δb, the stronger is yellowing. Reliability is improved by further measurements after 2 weeks. Reduced Yellowing is defined herein and preferred alkyd resins and compositions of the invention exhibit Reduced Yellowing.

Many other variations embodiments of the invention will be apparent to those skilled in the art and such variations are contemplated within the broad scope of the present invention.

Further aspects of the invention and preferred features thereof are given in the claims herein.

EXAMPLES

The present invention will now be described in detail with reference to the following non limiting examples which are by way of illustration only. Unless otherwise specified all parts, percentages and ratios are on a weight basis.

Preparation of a Sebacate Alkyd Resin (Resin A, Comparative=Comp I)

696 g of soybean fatty acid and 176 g of pentaerythritol were charged to a reactor fitted with thermocouple, stirrer, nitrogen flow and Dean-Stark trap, and heated to 240° C. under xylene reflux conditions. The temperature was maintained at 240° C. for 3 hours, when an acid value of less than 3 mg KOH/g was reached. The reactor was cooled to 60° C. and 220 g of sebacic acid was charged to the reactor. The reactor was heated to 230° C. under azeotropic conditions and the distillation was stopped when the acid value reached 8.5 mg KOH/g resin. The reactor was then cooled to 170° C. and vacuum distillation was started for removal of xylene azeotropic solvent. After cooling down to below 100° C. the resin was poured out.

Preparation of an Itaconate Alkyd Resin (Resin B) (=Example 1 of Invention)

717 g of soybean fatty acid and 181 g of pentaerythritol were charged to a reactor fitted with thermocouple, stirrer, nitrogen flow and Dean-Stark trap, and heated to 240° C. under xylene reflux conditions. The temperature was maintained at 240° C. for 3 hours, when an acid value of less than 3 mg KOH/g was reached. The reactor was cooled to 60° C. and 133 g of sebacic acid and 54 g of itaconic acid were charged to the reactor. The reactor was heated to 185° C. and kept at this temperature for 2 hours. The reactor was heated to 230° C. under azeotropic conditions and the distillation was stopped when the acid value reached 9.7 mg KOH/g resin. The reactor was then cooled to 170° C. and vacuum distillation was started for removal of xylene azeotropic solvent. After cooling down to below 100° C. the resin was poured out.

Preparation of a Maleate Alkyd Resin (Resin C, Comparative)=Comp II 720 g of soybean fatty acid and 183 g of pentaerythritol were charged to a reactor fitted with thermocouple, stirrer, nitrogen flow and Dean-Stark trap, and heated to 240° C. under xylene reflux conditions. The temperature was maintained at 240° C. for 3 hours, when an acid value of less than 3 mg KOH/g was reached. The reactor was cooled to 60° C. and 133 g of sebacic acid and 41 g of maleic anhydride were charged to the reactor. The reactor was heated to 185° C. and kept at this temperature for 2 hours. The reactor was heated to 230° C. under azeotropic conditions and the distillation was stopped when the acid value reached 12.8 mg KOH/g resin. The reactor was then cooled to 170° C. and vacuum distillation was started for removal of xylene azeotropic solvent. After cooling down to below 100° C. the resin was poured out.

Preparation of an Itaconate Alkyd Resin (Resin D) (Example 2 of Invention)

750 g of soybean fatty acid and 190 g of pentaerythritol were charged to a reactor fitted with thermocouple, stirrer, nitrogen flow and Dean-Stark trap, and heated to 240° C. under xylene reflux conditions. The temperature was maintained at 240° C. for 3 hours, when an acid value of less than 3 mg KOH/g was reached. The reactor was cooled to 120° C. and 150 g of itaconic acid were charged to the reactor. The reactor was heated to 185° C. and kept at this temperature for 2 hours. The reactor was heated to 230° C. under azeotropic conditions and the distillation was stopped when the acid value reached 14 mg KOH/g resin. The reactor was then cooled to 170° C. and vacuum distillation was started for removal of xylene azeotropic solvent. After cooling down to below 100° C. the resin was poured out.

Preparation of a Maleate Alkyd Emulsion (Resin E, Comparative)=Comp III 875 g of tall oil fatty acids, 241 g of tall rosin and 115 g of maleic anhydride were charged to a reactor fitted with thermocouple, stirrer, nitrogen flow and Dean-Stark trap, and heated to 180° C. After 2 hours the reactor was cooled to 120° C. and 218 g of glycerol were charged to the reactor. The reactor was heated to 230° C. under xylene reflux conditions and the distillation was stopped when the acid value reached 9 mg KOH/g resin. The reactor was then cooled to 180° C. and vacuum distillation was started for removal of xylene azeotropic solvent. After cooling down to below 100° C. the resin was poured out.

550 g of the resin was then emulsified as follows. The resin was heated to between 50-70° C. and 92 g of a 30% solution of a highly branched alcohol based surfactant combining anionic and non ionic components and was neutralised with a non-amine base and the mixture was stirred until homogeneous. Demineralised water was added during 2 hours until a solids content of 52% was obtained. The emulsion showed particle size of 217 nm; pH of 7.7 and viscosity of 188 mPas.

Preparation of an Itaconate Alkyd Emulsion (Resin F)=Example 3 of Invention 875 g of tall oil fatty acids, 241 g of tall rosin and 217 g of itaconic acid were charged to a reactor fitted with thermocouple, stirrer, nitrogen flow and Dean-Stark trap, and heated to 180° C. After 2 hours the reactor was cooled to 120° C. and 218 g of glycerol were charged to the reactor. The reactor was heated to 230° C. under xylene reflux conditions and the distillation was stopped when the acid value reached 15 mg KOH/g resin. The reactor was then cooled to 180° C. and vacuum distillation was started for removal of xylene azeotropic solvent. After cooling down to below 100° C. the resin was poured out.

550 g of the resin was emulsified as described for Resin E and diluted until solids content of 55% was obtained. The emulsion showed particle size of 283 nm, pH of 7.5 and viscosity of 212 mPas.

TABLE 1

Resin characteristics

| Example | Resin code | Resin based on: | Oil length (%) | Acid value mgKOH/g | Mn Da | Mw kDa |
|---|---|---|---|---|---|---|
| Comp I | A* | Sebacic acid | 72 | 7.3 | 4131 | 87 |
| Ex 1 | B | Sebacic & itaconic acid | 75 | 9.0 | 3352 | 25 |
| Comp II | C* | Sebacic acid & Maleic anhydride | 75 | 12.7 | 3341 | 27 |
| Ex 2 | D | Itaconic acid | 78 | 11.6 | 3802 | 128 |
| Comp III | E* | Maleic anhydride | 66 | 8 | 2020 | 65 |
| Ex 3 | F | Itaconic acid | 66 | 14 | 2026 | 121 |

*Resins A, C and E are comparative resins

Preparation of Non-Volatile Diluents

A dipenta ester diluent was prepared according to the following process: 1108 g of soya fatty acid, 160 g of dipentaerythritol and 50 g of xylene were charged to a reactor and heated to 250° C. under azeotropic conditions. Distillation was stopped when the acid value reached 10 mg KOH/g. Finally, the xylene was stripped under vacuum conditions at 200° C. Thereafter, the resulting dipenta ester diluent was discharged and used for the examples.

A dioctylfumarate diluent (also referred to herein as DOF) was prepared according to the following process: 459 g of 2-ethylhexanol, 205 g of fumaric acid and 50 g of xylene were charged to a reactor and heated to 190° C. under azeotropic conditions, using 1000 ppm Fascat 4101 tin catalyst. Distillation was stopped when the acid value reached 1 mg KOH/g. Finally, the xylene was stripped under vacuum conditions at 170° C. Thereafter, the resulting DOF diluent was discharged and used for the examples.

A dioctylmaleate diluent (also referred to herein as DOM) was prepared according to the following process: 382 g of 2-ethylhexanol, 144 g of maleic anhydride and 50 g of xylene were charged to a reactor and heated to 190° C. under azeotropic conditions, using 1000 ppm Fascat 4101 tin catalyst. Distillation was stopped when the acid value reached 1 mg KOH/g. Finally, the xylene was stripped under vacuum conditions at 170° C. Thereafter, the resulting DOM diluent was discharged and used for the examples.

A dioctylitaconate diluent (also referred to herein as DOIt) was prepared according to the following process: 367 g of 2-ethylhexanol, 183 g of itaconic acid and 50 g of xylene were charged to a reactor and heated to 190° C. under azeotropic conditions, using 1000 ppm Fascat 4101 tin catalyst. Distillation was stopped when the acid value reached 1 mg KOH/g. Finally, the xylene was stripped under vacuum conditions at 170° C. Thereafter, the resulting DOIt diluent was discharged and used for the examples.

Example 4 and Comp IV

Coating compositions were obtained by mixing with a normal lab stirrer 50 g of solid resin CompI (from resin A) or Example 1 (from resin B) with 35 g xylene, 2.87 g Nuodex Ca 5 (Elementis: metal drier), 0.42 g Nuodex Co 10 (Elementis: metal drier), 2.18 g Nuodex Zr 12 (Elementis: metal drier) and 0.6 g Exkin 2 (Elementis: anti-skinning agent). Yellowing and drying properties were determined as described herein and are given in Table 2.

TABLE 2

| | | Drying rate | | Yellowing behaviour | | |
| | | | | Initial | After 1 | After 2 |
| Example | Resin code | Dust free hours | Tack free hours | value b | week Δb | weeks Δb |
|---|---|---|---|---|---|---|
| Comp IV | A | 2:00 | 2:00 | 0.51 | 2.09 | 3.25 |
| Ex 4 | B | 3:00 | 3:00 | 0.53 | 1.67 | 2.54 |

It can be seen from Table 2 that although only 5% of the resin in Example 4 comprises an itaconic acid monomer, the yellowing behaviour has decreased by some 20% compared to comparative example Comp IV prepared without an itaconate monomer.

Example 5, Comp V and Comp VI

More coating compositions were obtained by mixing with a normal lab stirrer 50 g of respectively solid resin A (Comp V), B (Ex 5) or C (Comp VI) with 35 g xylene, 2.87 g Nuodex Ca 5, 0.42 g Nuodex Co 10, 2.18 g Nuodex Zr 12 and 0.6 g Exkin 2. Yellowing properties were determined as described herein and are given in Table 3:

TABLE 3

| | | Yellowing behaviour | |
| Example | Resin code | Initial value b | After 1 week Δb | After 3 weeks Δb |
|---|---|---|---|---|
| Comp V | A | 0.88 | 1.54 | 3.47 |
| Ex 5 | B | 1.00 | 1.30 | 2.94 |
| Comp VI | C | 0.92 | 1.64 | 3.82 |

It can be seen from Table 3 that although only 5% of the resin in Example 5 comprises itaconic acid monomer, as before the yellowing behaviour has decreased by 15-25% compared to either of the comparative examples (Comp V and Comp VI) which were not prepare using itaconic acid monomer. Comp VI was prepared from maleate alkyd (Resin C). It is particularly surprising that despite having a similar structure to maleic acid, compositions prepared from itaconic acid have especially advantageous yellowing properties. Compositions prepared using itaconic acid (and/or esters and/or anhydrides thereof) are particularly preferred embodiments of this invention.

Examples 6, 7 and Comp VII and VIII

Further coating compositions were obtained by mixing with a normal lab stirrer 40 g of respectively solid resin A (Comp VII), B (Ex 6), C (Comp VIII) or D (Ex 7) with 35 g xylene, 0.32 g Nuodex Co 10, and 0.4 g Exkin 2. Yellowing properties were determined as described herein and are given in Table 4:

TABLE 4

| | | Drying rate | | Yellowing behaviour | | |
| | | | | Initial | After 1 | After 4 |
| Example | Resin code | Dust free hours | Tack free hours | value b | week Δb | weeks Δb |
|---|---|---|---|---|---|---|
| Comp VII | A | 3:30 | 4:00 | 0.32 | 2.55 | 6.27 |
| Ex 6 | B | 3:30 | 4:00 | 0.66 | 2.30 | 5.35 |
| Comp VIII | C | 3:00 | 3:30 | 0.54 | 2.68 | 6.41 |
| Ex 7 | D | 3:30 | 4:00 | 0.85 | 1.58 | 3.48 |

It can be seen from Table 3 that although only 5% of resin B comprises itaconic acid monomer, the yellowing behaviour has decreased by some 10-20% compared to either of the comparative examples (Comp VII and Comp VIII) which were not prepared using itaconic acid monomer. Resin D is based on 15% of itaconic acid and decreases yellowing by about 45% compared to Comp VII or Comp VIII.

Example 8 and Comp IX and X

A Solid Resin derived from a commercially available product was prepared by stripping off the solvent from Uralac® HS 233 (from DSM under that registered trademark) by vacuum distillation. Some more coating compositions were then obtained by mixing with a normal lab stirrer 24 g of the Solid Resin (obtained above) with 13 g dipenta ester diluent and 8 g of different diluents respectively DOF (Comp IX), DOM (Comp X) or DOIt (Example 8), 2.0 g Nuodex Ca 5, 0.4 g Nuodex Co 10, 2.0 g Nuodex Zr 12, and 0.4 g Exkin 2. Resulting paints had a VOC content of 51 g/l (calculated). Yellowing properties were determined with the following results:

TABLE 5

| | | Yellowing behaviour | |
| Example | Diluent code | Initial value b | After 1 week Δb | After 2 weeks Δb |
|---|---|---|---|---|
| Comp IX | DOF | 5.67 | 1.40 | 2.90 |
| Comp X | DOM | 5.93 | 1.30 | 2.89 |
| Ex 5 | DOIt | 6.08 | 0.21 | 1.26 |

It can be seen from Table 5 that although only 6% or the total binder in Example 5 comprises itaconic acid monomer, and although it is present unreacted as a diluent, the yellowing behaviour of the resultant coating has decreased by more than 50% compared to either of the comparative examples (ComplX or CompX) which were not prepared using itaconic acid as a diluent. The advantage compared to maleate and fumarate diluents is surprising given their similar structures. Compositions prepared from itaconic acid as diluent have especially advantageous yellowing properties and so are particularly preferred embodiments of this invention.

Example 9 and Comp XI

A waterborne mill base (WB Mill Base) was prepared by mixing 20 parts of demineralised water, 3.5 parts Disperbyk 2015 (Byk: dispersant), 0.25 parts Byk 024 (Byk; defoamer), 1.3 parts Rheolate 644 (Elementis; thickener) and 60 parts Tioxide TR 92 (Huntsman; pigment) using a high speed stirrer. Further coating compositions were obtained from the WB Mill Base (obtained as described above) by mixing with a normal lab stirrer 24.8 g of respectively solid resin E (Comp XI) or F (Example 9) with 30.8 g WB Mill Base, 3.4 g Rheolate 644, 0.32 g Borchi OxyCoat 1101 (Borchers; metal drier), and remainder demineralised water to obtain 100 g of paint. Yellowing and drying properties were determined with the following results set out in Tables 6 and 7 below:

TABLE 6

| Example | Resin code | König Hardness After 2 weeks seconds | Gloss After 1 week 20°/60° | Drying behaviour Dust free hours | Dust free hours |
|---|---|---|---|---|---|
| Comp XI | E | 11 | 75/85 | 3:30 | 3:30 |
| Ex9 | F | 10 | 79/87 | 4:15 | 4:15 |

TABLE 7

| | | Yellowing behaviour | | |
|---|---|---|---|---|
| Example | Resin code | Initial value b | After 1 week Δb | After 4 weeks Δb |
| Comp XI | E | 1.87 | 2.59 | 4.29 |
| Ex9 | F | 1.23 | 1.73 | 2.78 |

It can be seen from Tables 6 and 7 that the aqueous coating composition Example 9 comprising Resin F based on 15% of itaconic acid forms a coating that has reduced yellowing by about 35% compared to a comparative example (CompXI) not prepared using itaconic acid. Thus it can be seem that waterborne emulsions of the invention also show strongly improved yellowing whilst the applicant has found that other properties remain comparable to known resins.

The invention claimed is:

1. A low VOC unsaturated alkyd resin P''' obtained by reaction in a process (III) between the following components:
   (A) Optional Component A comprising from 0 to 30% by weight of naturally occurring Rosin, the Rosin comprising from 40 to 80 parts per hundred by weight of Rosin of an unsaturated mono carboxylic acid comprising at least one $C_{15-25}$cyclohydrocarbo moiety capable of undergoing a Diels Alder or Ene reaction;
   (B) Component B comprising from 25 to 80% by weight of a linear $C_{12-60}$ hydrocarbo carboxylic acid comprising at least one conjugated ethylenically unsaturated double bond;
   (C) Component C comprising from 5 to 30% by weight of an ethylenically unsaturated $C_{5-6}$hydrocarbo dicarboxylic acid, ester thereof, and/or anhydride thereof, being reactive as a dienophile and/or enophile with Component B and/or Component A where present;
   (D) Component D comprising from 1 to 40% by weight of at least one polyhydric alcohol (polyol);
   (E) Optional Component E comprising at least one monomer other than any of Components A to D;
   the total of Components A to E being 100%;
   to obtain the alkyd resin P''' and wherein the alkyd resin P''' obtained from the process (III) has:
   (i) an acid value of no more than 50 mg KOH per g of the solid alkyd resin;
   (ii) a number average molecular weight ($M_n$) of at least 1200 g/mol;
   (iii) an oil length from 60 to 78; and
   (iv) optionally a renewable content of at least 50% by weight of components (A) to (E) where present; and
   wherein
   low VOC denotes that the total amount of organic compounds that have a boiling point from 50 to 250° C. that are present in the composition is less than 100 g/l.

2. The low VOC alkyd resin P''' as claimed in claim 1, wherein the alkyd resin P''' obtained from the process (III) has an oil length from 65 to 78.

3. The low VOC alkyd resin P''' as claimed in claim 1, which is capable of being water borne.

4. The low VOC alkyd resin P''' as claimed in claim 1, which is capable of being solvent borne.

5. The low VOC alkyd resin P''' as claimed in claim 1, in which
   Component A is selected from the group consisting of: abietic acid, palustric acid, levopimaric acid, sandaracopimaric acid and/or mixtures thereof and the amount of Component A is from 5% to 28% of the total monomer A to E; and in which
   Component B is selected from the group consisting of palmitoleic acid, ricinoleic acid, oleic acid, myristoleic acid, erucic acid, gadoleic acid, linoleic acid, linolenic acid, α(alpha)-eleostearic acid (ELA), β(beta)-eleosteric acid, α(alpha)-linolenic acid (ALA), licanic acid, arachidonic acid, eicosapentaenoic acid (EPA), clupanodonic acid (DPA), osbond acid, docosahexaenoic acid (DHA) and/or esters and/or mixtures thereof; and wherein the amount of Component B is from 30% to 75% of the total monomer A to E; and in which
   Component C is selected from itaconic acid, itaconic anhydride, citraconic acid, citraconic anhydride and/or mixtures thereof; and the amount of Component C as a monomer is from 5% to 28% of the total monomer A to E; and in which
   Component D is selected from glycerol; pentaerythritol; mannitol, sorbitol, isosorbide, sorbitan and/or mixtures thereof; and the amount of Component D is from 5% to 28% of the total monomer A to E.

6. The low VOC alkyd resin P''' as claimed in claim 1, wherein the process (III) comprises a cyclo-addition step and an esterification step that said steps may be performed in any order, wherein
   the cyclo-addition step of process (III) comprises cyclo-reacting Component (C) which is reactive as a dienophile and/or enophile and comprises ethylenically unsaturated $C_{5-6}$hydrocarbo dicarboxylic acid, ester thereof, and/or anhydride thereof, with at least one dienophile and/or enophile reactive component selected from the group consisting of:
      Component (A) comprising a naturally occurring Rosin comprising from 40 to 80 parts per hundred by weight of Rosin of an unsaturated mono carboxylic acid comprising at least one $C_{15-25}$cyclohydrocarbo moiety capable of undergoing a Diels Alder or Ene reaction;
      Component (B) comprising a linear $C_{12-60}$hydrocarbo carboxylic acid comprising at least one conjugated ethylenically unsaturated double bond;
      an alkyd adduct formed by reacting Component (D) comprising a polyol with at least one of Component (A) and Component (B); and wherein
   the esterification step of process (III) comprises reacting at least one acid functional component selected from the group consisting of:

an acid functional alkyd adduct formed by reacting Component (D) with at least one of Component (A) and Component (B);
Component (A); and
Component (B);
with at least one hydroxy functional component selected from the group consisting of:
a hydroxyl functional alkyd adduct formed by reacting a Component (D) with at least one of the Component (A) and the Component (B); and
Component D; wherein
the Component (B) is present in at least one of the cyclo-addition step and the esterification step; and
the Component (D) is present in at least one of the cyclo-addition step and the esterification step.

7. The low VOC alkyd resin P‴ as claimed in claim 6, in which
Component A is selected from the group consisting of: abietic acid, palustric acid, levopimaric acid, sandaracopimaric acid and/or mixtures thereof and the amount of Component A is from 5% to 28% of the total monomer A to E; and in which
Component B is selected from the group consisting of palmitoleic acid, ricinoleic acid, oleic acid, myristoleic acid, erucic acid, gadoleic acid, linoleic acid, linolenic acid, α(alpha)-eleostearic acid (ELA), β(beta)-eleostearic acid, α(alpha)-linolenic acid (ALA), licanic acid, arachidonic acid, eicosapentaenoic acid (EPA), clupanodonic acid (DPA), osbond acid, docosahexaenoic acid (DHA) and/or esters and/or mixtures thereof; and wherein the amount of Component B is from 30% to 75% of the total monomer A to E; and in which
Component C is selected from itaconic acid, itaconic anhydride, citraconic acid, citraconic anhydride and/or mixtures thereof; and the amount of Component C as a monomer is from 5% to 28% of the total monomer A to E; and in which
Component D is selected from glycerol; pentaerythritol; mannitol, sorbitol, isosorbide, sorbitan and/or mixtures thereof; and the amount of Component D is from 5% to 28% of the total monomer A to E.

8. The low VOC alkyd resin P‴ as claimed in claim 1, which is a solid.

9. The low VOC alkyd resin P‴ as claimed in claim 3, which further comprises at least one surfactant which is added during the reaction of Components A to E.

10. The low VOC alkyd resin P‴ as claimed in claim 9, wherein the at least on surfactant comprises a mixture of nonionic and ionic surfactants.

11. The low VOC alkyd resin P‴ as claimed in claim 5, wherein Component B comprises a glycerol ester of at least one compound selected from the group consisting of palmitoleic acid, ricinoleic acid, oleic acid, myristoleic acid, erucic acid, gadoleic acid, linoleic acid, linolenic acid, α(alpha)-eleostearic acid (ELA), β(beta)-eleostearic acid, α(alpha)-linolenic acid (ALA), licanic acid, arachidonic acid, eicosapentaenoic acid (EPA), clupanodonic acid (DPA), osbond acid, docosahexaenoic acid (DHA).

12. The low VOC alkyd resin P‴ as claimed in claim 7, wherein Component B comprises a glycerol ester of at least one compound selected from the group consisting of palmitoleic acid, ricinoleic acid, oleic acid, myristoleic acid, erucic acid, gadoleic acid, linoleic acid, linolenic acid, α(alpha)-eleostearic acid (ELA), β(beta)-eleostearic acid, α(alpha)-linolenic acid (ALA), licanic acid, arachidonic acid, eicosapentaenoic acid (EPA), clupanodonic acid (DPA), osbond acid, docosahexaenoic acid (DHA).

13. A coating composition comprising an alkyd resin as claimed in claim 1.

14. A coating composition comprising an alkyd resin as claimed in claim 2.

15. A coating composition comprising an alkyd resin as claimed in claim 5.

16. The coating composition as claimed in claim 13 which is water borne.

17. The coating composition as claimed in claim 13 which is solvent borne.

18. The coating composition as claimed in claim 13 which is a powder coating composition.

19. A substrate and/or article having coated thereon a coating composition, optionally cured, of claim 13.

20. A method preparing a coating composition which comprises using the low VOC unsaturated alkyd resin P‴ as claimed in claim 1.

21. A method for preparing a coated substrate and/or article comprising the steps of applying a coating composition as claimed in claim 13 to a substrate and/or article; optionally drying the composition in situ and/or optionally curing the composition in situ to form a coating thereon.

* * * * *